(12) United States Patent
Singh et al.

(10) Patent No.: US 10,008,296 B2
(45) Date of Patent: Jun. 26, 2018

(54) PASSIVELY-COOLED SPENT NUCLEAR FUEL POOL SYSTEM

(71) Applicant: SMR Inventec, LLC, Marlton, NJ (US)

(72) Inventors: Krishna P. Singh, Hobe Sound, FL (US); Joseph Rajkumar, Marlton, NJ (US)

(73) Assignee: SMR INVENTEC, LLC

( * ) Notice: Subject to any disclaimer, the term of this patent is extended or adjusted under 35 U.S.C. 154(b) by 602 days.

(21) Appl. No.: 14/713,093

(22) Filed: May 15, 2015

(65) Prior Publication Data

US 2015/0287483 A1 Oct. 8, 2015

Related U.S. Application Data

(63) Continuation-in-part of application No. 14/620,465, filed on Feb. 12, 2015, which is a continuation-in-part
(Continued)

(51) Int. Cl.
*G21C 15/18* (2006.01)
*G21C 19/07* (2006.01)
(Continued)

(52) U.S. Cl.
CPC ............. *G21C 15/18* (2013.01); *G21C 13/02* (2013.01); *G21C 19/04* (2013.01); *G21C 19/07* (2013.01); *G21C 11/00* (2013.01); *Y02E 30/40* (2013.01)

(58) Field of Classification Search
CPC ........ G21C 19/07; G21C 13/02; G21C 15/18; G21C 19/04; G21C 11/00; Y02E 30/40
(Continued)

(56) References Cited

U.S. PATENT DOCUMENTS 2,621,492 A 12/1952 Beardsley et al.
2,640,686 A 6/1953 Brown, Jr.
(Continued)

FOREIGN PATENT DOCUMENTS

GB 2251117 6/1992
JP S5813159 1/1983
(Continued)

OTHER PUBLICATIONS

Corresponding Office Action and Search Report issued by the RUPTO dated Mar. 29, 2016.
(Continued)

*Primary Examiner* — Jack W Keith
*Assistant Examiner* — Daniel Wasil
(74) *Attorney, Agent, or Firm* — The Belles Group, P.C.

(57) ABSTRACT

A passively-cooled spent nuclear fuel pool system in one embodiment includes a containment vessel comprising a thermally conductive shell and an annular reservoir surrounding the shell that holds a liquid coolant forming a heat sink. A spent fuel pool is disposed inside the containment vessel and includes a body of water in contact with a peripheral sidewall of the fuel pool. At least one spent nuclear fuel rod submerged in the body of water heats the water. The peripheral sidewall of the spent fuel pool is formed by a portion of the shell of the containment vessel adjacent to the fuel pool, thereby defining a shared common heat transfer wall. The heat transfer wall operates to transfer heat from the body of water in the spent fuel pool to the heat sink to cool the body of water. The heat transfer wall comprises metal in one embodiment.

11 Claims, 11 Drawing Sheets

Related U.S. Application Data of application No. PCT/US2013/054973, filed on Aug. 14, 2013, application No. 14/713,093, filed on May 15, 2015, which is a continuation-in-part of application No. 14/403,082, filed as application No. PCT/US2013/042070 on May 21, 2013, now Pat. No. 9,786,393.

(60) Provisional application No. 61/993,857, filed on May 15, 2014, provisional application No. 61/683,030, filed on Aug. 14, 2012, provisional application No. 61/649,593, filed on May 21, 2012.

(51) Int. Cl.
*G21C 13/02* (2006.01)
*G21C 19/04* (2006.01)
*G21C 11/00* (2006.01)

(58) Field of Classification Search
USPC .......................................... 376/272
See application file for complete search history.

(56) References Cited

U.S. PATENT DOCUMENTS

| | | | |
|---|---|---|---|
| 4,404,165 | A | 9/1983 | Hesky et al. |
| 5,075,070 | A | 12/1991 | Costes |
| 5,570,401 | A | 10/1996 | Gluntz |
| 5,612,982 | A | 3/1997 | Woodcock et al. |
| 2012/0051484 | A1 | 3/2012 | Schmidt et al. |
| 2012/0106692 | A1 | 5/2012 | Keenan |
| 2013/0272474 | A1 | 10/2013 | Conway et al. |

FOREIGN PATENT DOCUMENTS

| | | |
|---|---|---|
| JP | H02223896 | 9/1990 |
| RU | 2084025 | 7/1997 |
| RU | 2403633 | 11/2010 |
| WO | 2013096966 | 6/2013 |
| WO | 2014028634 | 2/2014 |

OTHER PUBLICATIONS

Corresponding International Search Report and Written Opinion for PCT/US13/54973 dated Jan. 16, 2014.
Corresponding International Search Report and Written Opinion for PCT/US15/30969 dated Sep. 14, 2015.

PASSIVELY-COOLED SPENT NUCLEAR FUEL POOL SYSTEM

CROSS-REFERENCE TO RELATED PATENT APPLICATIONS

The present application claims the benefit of U.S. Provisional Patent Application No. 61/993,857 filed May 15, 2014. The present application is also a continuation-in-part of U.S. patent application Ser. No. 14/620,465 filed Feb. 12, 2015, which in turn is a continuation-in-part of PCT/US2013/054973 filed Aug. 14, 2013, which in turn claims the benefit of U.S. Provisional Patent Application No. 61/683,030 filed Aug. 14, 2012. The present application is also a continuation-in-part of U.S. patent application Ser. No. 14/403,082 filed Nov. 21, 2014, which in turn is a national stage entry under 35 U.S.C. 371 of PCT/US13/42070 filed May 21, 2013, which in turn claims the benefit of U.S. Provisional Patent Application No. 61/649,593 filed May 21, 2012. The entireties of the aforementioned applications are all incorporated herein by reference.

FIELD OF THE INVENTION

The present invention relates to a passive system for cooling a spent nuclear fuel pool and a method of passively cooling a spent nuclear fuel pool.

BACKGROUND OF THE INVENTION

A spent fuel pool is a body of water inside a nuclear power plant's fuel storage building which is typically about forty feet deep and which is equipped with fuel racks to store spent nuclear fuel that is discharged from the reactor during refueling outages. The pool keeps the fuel in a safe underwater configuration absorbing the fuel's radiation and its decay heat. The decay heat deposited by the fuel into the pool's water must be removed to prevent uncontrolled heat-up of the pool's water, which would result in undesirable evaporation of the fuel pool water. In existing nuclear plant design practice, the pool's water is cooled by pumping it though a heat exchanger, which is typically served by the plant's component cooling water, a closed loop purified water stream that cools a variety of equipment in the plant and is in turn cooled by a natural source of water such as a lake, a river, or an ocean.

This conventional spent fuel pool cooling system has several drawbacks, the most notable of which is the dependence of the pool cooling on pumps and motors to circulate water through both sides of the heat exchanger. During a power outage or some other event that disables the pumps and motors, the water in the spent fuel pool will boil and evaporate which can lead to the fuel being exposed above the surface level of the pool water. Another drawback is the continuous release of water vapor inside the plant's fuel storage building which adds to the building's humidity and temperature affecting its habitability and increasing its HVAC burden. The open pool also attracts dust and particulates from the ambient air turning them into radioactive material which must be suctioned from the pool, filtered and collected for disposal as contaminated waste.

Thus, a need exists for a system and method for cooling a spent nuclear fuel pool that does not rely on pumps and motors. A need also exists for a system and method for reducing the humidity inside of a nuclear power plant fuel storage building. Furthermore, a need exists for a system and method for preventing dust and particulates from collecting in the spent fuel pool.

SUMMARY OF THE INVENTION

The present invention provides a passively-cooled spent nuclear fuel pool system and method therefor that overcomes the deficiencies of the foregoing existing arrangements. The approaches disclosed herein cool the body of water in the spent fuel pool which is heated by radioactive fuel decay via evaporation, and also convection-conduction using an external heat sink relying on natural gravity-driven flow circulation patterns as further described herein. These approaches do not rely on pumps or available electric power to effectively cool the spent fuel pool. The method of heat rejection therefore does not need any active components or even any passive actuating devices to initiate the cooling processes. The heat rejection will automatically start and continue as long as there is a heat source in the pool (i.e. spent fuel assemblies).

In one aspect of spent fuel pool cooling, a containment vessel is circumscribed by an annular reservoir containing a liquid coolant such as water. A portion of the cylindrical wall of the vessel is shared with and forms a common thermally-conductive wall with the spent fuel pool between the reservoir and spent fuel pool. In one embodiment, this shared common wall is made of a high conductivity metal, such as without limitation carbon or low alloy steel. This defines a conductive heat transfer wall between the spent fuel pool and the reservoir. The inner surface of the heat transfer wall (i.e. containment vessel) is in direct contact with and wetted by the spent fuel pool water. The coolant water outside the containment vessel in the annular reservoir is in contact with the external surface of the heat transfer wall containment vessel. This configuration enables direct heat transfer from the heated spent fuel pool water to the lower temperature coolant reservoir via conductive heat transfer through the metal heat transfer wall of the containment vessel to enhance cooling of the fuel pool. Other features are disclosed herein which further aid direct cooling of the body of water in the spent fuel pool via gravity driven thermal gradient induced flow patterns.

In one form, a passively-cooled spent nuclear fuel pool system includes: a containment vessel comprising a thermally conductive cylindrical shell formed of metal; an annular reservoir surrounding the cylindrical shell of the containment vessel, the annular reservoir holding a liquid coolant to form a heat sink; and a spent nuclear fuel pool disposed inside the containment vessel, the fuel pool comprising: a floor and a first peripheral sidewall extending upwards from the floor that collectively define an interior cavity; a body of water disposed in the interior cavity and having a surface level, the water being in contact with the first peripheral sidewall; and at least one spent nuclear fuel rod submerged in the body of water that heats the body of water; wherein the first peripheral sidewall of the fuel pool is formed by a portion of the cylindrical shell of the containment vessel adjacent to the spent fuel pool which defines a shared common heat transfer wall, the heat transfer wall operable to transfer heat from the body of water in the spent fuel pool to the heat sink for cooling the body of water.

In another form, a passively-cooled nuclear spent fuel pool system includes: a containment vessel comprising a thermally-conductive cylindrical shell formed of metal; an annular reservoir surrounding the cylindrical shell of the containment vessel, the annular reservoir holding a coolant that defines a heat sink; a spent nuclear fuel pool disposed in the containment vessel, the fuel pool comprising: a floor and a first peripheral sidewall extending upwards from the floor that collectively define an interior cavity; a body of water disposed in the interior cavity and having a surface level, at least one spent nuclear fuel rod submerged in the body of water that heats the water to form water vapor via evaporation; a removable lid covering the spent nuclear fuel pool and configured to form a hermetically sealed vapor space between the surface level of the body of water and the lid; a passive heat exchange sub-system comprising an assembly of: a primary riser section fluidly coupled to the vapor space; at least one downcomer fluidly coupled to the primary riser section for receiving the water vapor from the primary riser section, the water vapor condensing within the at least one downcomer to form a condensed water vapor; and at least one return conduit fluidly coupled to the at least one downcomer, the at least one return conduit having an outlet located within the body of liquid water for returning the condensed water vapor to the body of liquid water; wherein the first peripheral sidewall of the fuel pool is formed by a portion of the cylindrical shell of the containment vessel adjacent to the spent fuel pool that defines a shared heat transfer wall, the heat transfer wall operable to transfer heat from the body of water in the spent fuel pool to the heat sink for cooling the body of water.

A method for cooling a nuclear spent fuel pool is provided. The method includes: providing a spent fuel pool arranged inside a containment vessel and an annular reservoir surrounding the containment vessel at least partially filled with coolant water at a first temperature, the spent fuel pool and containment vessel sharing a thermally-conductive common wall disposed between the spent fuel pool and the annular reservoir; at least partially filing the spent nuclear fuel pool with a body of water having a surface level; submerging a spent fuel rack containing at least one nuclear spent fuel rod in the body of water in the spent fuel pool; heating the water in the spent fuel pool with the at least one spent fuel rod to a second temperature higher than first temperature; contacting the common wall with the heated water in the spent fuel pool; transferring heat from the heated water in the spent fuel pool through the common wall to the coolant water in the annular reservoir thereby cooling the heated water in the spent fuel pool.

In another aspect, the invention can also be a passively-cooled spent nuclear fuel pool system comprising: a spent nuclear fuel pool comprising: a body of liquid water having a surface level, at least one spent nuclear fuel rod submerged in the body of liquid water that heats the body of liquid water; a lid covering the spent nuclear fuel pool to form a hermetically sealed vapor space between the surface level of the body of liquid water and the lid, the lid comprising a first lid section and a second lid section; and a first divider extending from the lid a partial distance into the body of liquid water to divide the vapor space into a first vapor space section located between the first lid section and the body of liquid water and a second vapor space section located between the second lid section and the body of liquid water; and a passive heat exchange sub-system comprising: a riser conduit comprising a first riser inlet section having a first inlet positioned within the first vapor space section, a second riser inlet section having a second inlet positioned within the second vapor space section and a primary riser section, wherein the riser conduit receives water vapor from the first and second vapor space sections; at least one downcomer fluidly coupled to the primary riser section for receiving the water vapor from the primary riser section, the water vapor condensing within the at least one downcomer to form a condensed water vapor; and at least one return conduit fluidly coupled to the at least one downcomer, the at least one return conduit having an outlet located within the body of liquid water for returning the condensed water vapor to the body of liquid water.

In another aspect, the invention can be a passively-cooled spent nuclear fuel pool system comprising: a spent nuclear fuel pool comprising: a body of liquid water having a surface level, at least one spent nuclear fuel rod submerged in the body of liquid water that heats the body of liquid water; and a lid covering the spent nuclear fuel pool to create a vapor space between the surface level of the body of liquid water and the lid; and a passive heat exchange sub-system comprising: at least one riser conduit having an inlet located within the vapor space for receiving water vapor from the vapor space; at least one downcomer conduit fluidly coupled to the riser conduit for receiving the water vapor from the riser conduit, the water vapor condensing within the downcomer conduit to form a condensed water vapor; and at least one return conduit fluidly coupled to the at least one downcomer conduit, the return conduit having an outlet located within the body of liquid water for returning the condensed water vapor to the body of liquid water.

In yet another aspect, the invention can be a passively-cooled spent nuclear fuel pool system comprising: a spent nuclear fuel pool comprising a body of liquid water having a surface level, at least one spent nuclear fuel rod submerged in the body of liquid water that heats the body of liquid water; a lid covering the spent nuclear fuel pool to create a hermetically sealed vapor space between the surface level of the body of liquid water and the lid; and a passive heat exchange sub-system fluidly coupled to the vapor space, the passive heat exchange sub-system configured to: (1) receive water vapor from the vapor space; (2) remove thermal energy from the received water vapor, thereby condensing the water vapor to form a condensed water vapor; and (3) return the condensed water vapor to the body of liquid water.

In a further aspect, the invention can be a method of passively cooling a spent nuclear fuel pool comprising: a) covering the spent nuclear fuel pool with a lid thereby forming a vapor space having water vapor between the lid and a surface level of a body of liquid water located within the spent fuel pool; b) passively flowing the water vapor from the vapor space through a heat exchange sub-system that removes thermal energy from the water vapor to form a condensed water vapor; and c) passively flowing the condensed water vapor from the heat exchange sub-system to the body of liquid water.

In a still further aspect, the invention can be a method of passively cooling a spent nuclear fuel pool comprising: a) at least partially filing the spent nuclear fuel pool with a body of liquid water having a surface level; b) submerging at least one nuclear fuel rod in the body of liquid water, the at least one nuclear fuel rod heating the body of liquid water; c) covering the body of a liquid water with a lid to form a hermetically sealed vapor space between the surface level of the body of liquid water and the lid, the lid comprising a first lid section and a second lid section; d) dividing the vapor space into a first vapor space section located between the first lid section and the body of liquid water and a second vapor space section located between the second lid section and the body of liquid water, the first and second vapor space sections being hermetically isolated from one another by a divider; e) fluidly coupling a heat exchange sub-system to the spent nuclear fuel pool, the heat exchange sub-system having a riser conduit, a downcomer conduit and a return conduit that are fluidly coupled together, the riser conduit having an inlet positioned within each of the first and second vapor space sections and the return conduit having an outlet positioned within the body of liquid water; and wherein water vapor flows from the first and second water vapor space sections to the riser conduit and from the riser conduit into the downcomer conduit, wherein the water vapor condenses within the downcomer conduit to form a condensed water vapor, and wherein the condensed water vapor flows from the downcomer conduit and into the return conduit and from the return conduit into the body of liquid water.

BRIEF DESCRIPTION OF THE DRAWINGS

The features of the exemplary embodiments of the present invention will be described with reference to the following drawings, where like elements are labeled similarly, and in which.

Figure 1:
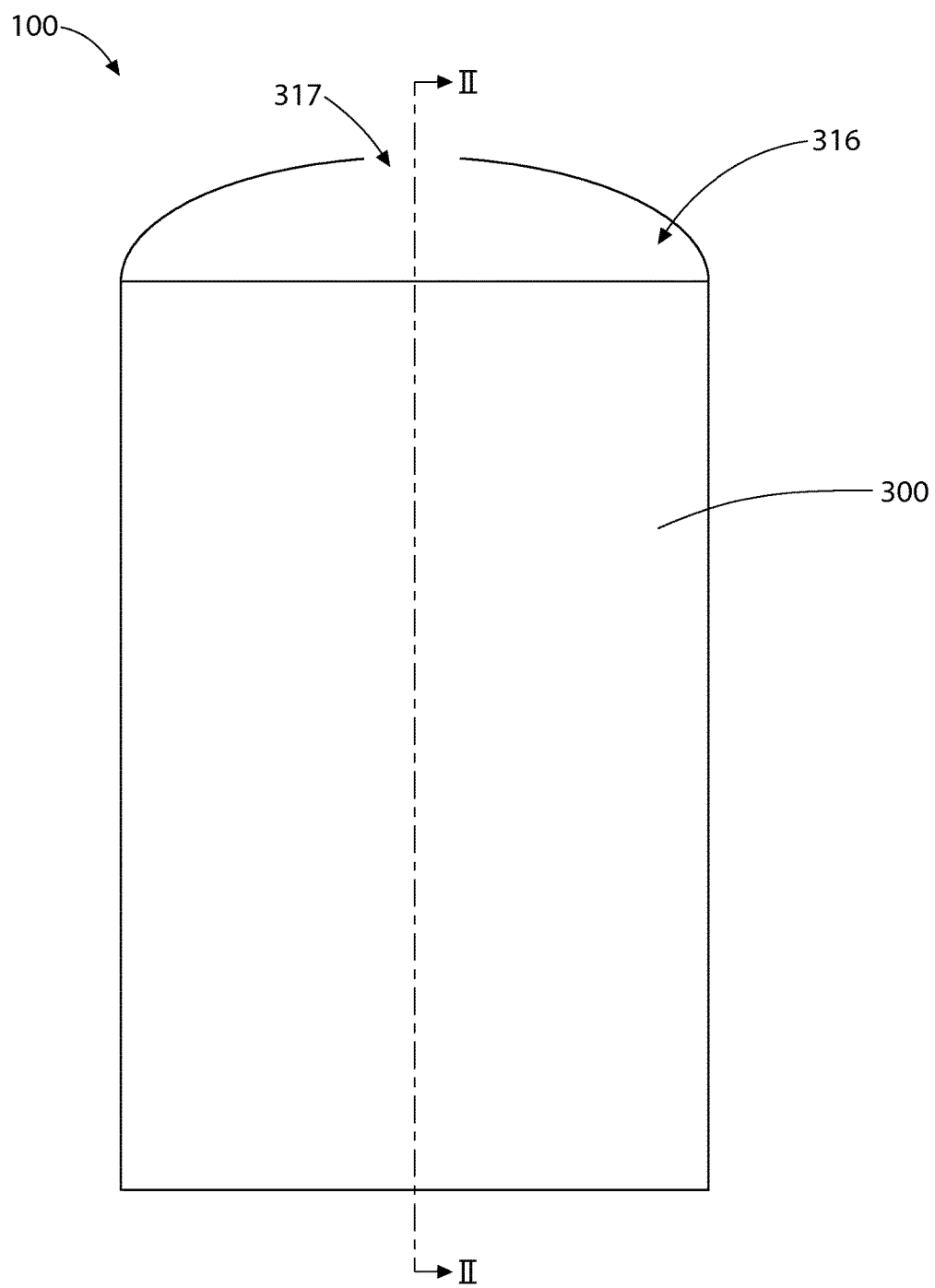
FIG. 1 is a front view of a containment enclosure for a nuclear reactor in accordance with an embodiment of the present invention.

All drawings are schematic and not necessarily to scale.

DETAILED DESCRIPTION OF THE INVENTION

The features and benefits of the invention are illustrated and described herein by reference to exemplary embodiments. This description of exemplary embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal,", "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Accordingly, the disclosure expressly should not be limited to such exemplary embodiments illustrating some possible non-limiting combination of features that may exist alone or in other combinations of features.

Figure 2:
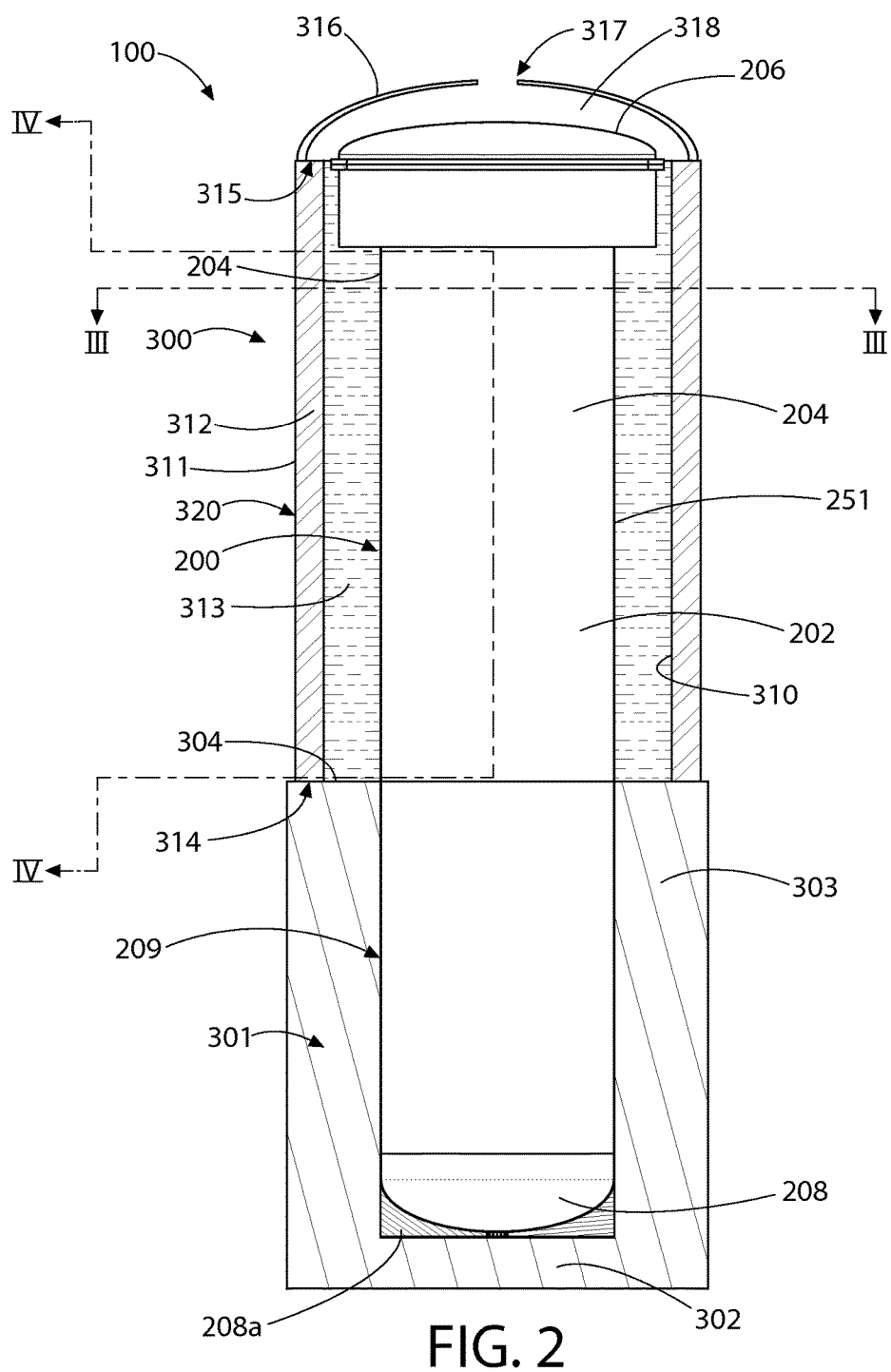
FIG. 2 is a cross-sectional view through the containment enclosure taken along line II-II of FIG. 1 illustrating a containment vessel at least partially surrounded by the containment enclosure.

Referring first to FIGS. 1 and 2 concurrently, a nuclear reactor containment system 100 is illustrated in accordance with an embodiment of the present invention. The system 100 generally includes an inner containment structure such as a containment vessel 200 and an outer containment enclosure 300. The containment vessel 200 and the containment enclosure 300 are vertically elongated structures that house certain components of a nuclear power plant such as a nuclear reactor and a spent nuclear fuel pool. The containment vessel 200 and the containment enclosure 300 collectively form a containment vessel-enclosure assembly 200-300. In certain embodiments, the containment enclosure 300 and the containment vessel 200 may be partially buried in the subgrade. The details of the containment vessel 200 and the containment enclosure 300 are described in detail below and in International Application No. PCT/US13/42070, filed on May 21, 2013, the entirety of which is incorporated herein by reference.

In certain embodiments, the containment vessel-enclosure assembly 200-300 may be supported by a concrete foundation 301 comprised of a bottom slab 302 and vertically extending sidewalls 303 rising from the bottom slab 302 and forming a top base mat 304. The sidewalls 303 may circumferentially enclose a lower portion 209 of the containment vessel 200 as shown in FIG. 2 wherein the lower portion 209 of the containment vessel 200 is positioned inside the sidewalls 303. In some embodiments, the sidewalls 303 may be poured after placement of the containment vessel 200 on the bottom slab 302 (which may be poured and set first) thereby completely embedding the lower portion 209 of the containment vessel 200 within the foundation 301. The foundation sidewalls 303 may terminate below grade in some embodiments to provide additional protection for the containment vessel-enclosure assembly 200-300 from projectile impacts (e.g. crashing plane, etc.). The foundation 301 may have any suitable configuration in a top plan view, including without limitation polygonal (e.g. rectangular, hexagon, circular, etc.).

The containment enclosure 300 may be a double-walled structure in some embodiments having sidewalls 320 formed by two substantially radially spaced and interconnected concentric shells 310 (inner) and 311 (outer) with plain or reinforced concrete 312 installed in the annular space between the inner and outer shells 310, 311. In such embodiments, the inner and outer shells 310, 311 may be made of any suitably strong material, such as for example without limitation ductile metallic plates that are readily weldable (e.g. low carbon steel). Other suitable metallic materials including various alloys may be used. In one embodiment, without limitation, the double-walled containment enclosure 300 may have a concrete 312 thickness of six feet or more which ensures adequate ability to withstand high energy projectile impacts such as that from an airliner.

The containment enclosure 300 circumscribes the containment vessel 200 and is spaced substantially radially apart from the containment vessel 200, thereby creating a heat sink space 313 between an outer surface 251 of the containment vessel 200 and the inner shell 310 of the containment enclosure 300. The heat sink space 313 may be a liquid reservoir in one embodiment such that the heat sink space 313 is filled with a liquid such as water to create a heat sink for receiving and dissipating heat from the containment vessel 200 in the case of a thermal energy release incident inside the containment vessel 200. The heat sink can also be used to remove thermal energy from a spent nuclear fuel pool located within the containment vessel 200 as discussed in more detail below with reference to FIGS. 7 and 9. This water-filled heat sink space 313 extends circumferentially for a full 360 degrees in one embodiment such that the heat sink space 313 is an annular space circumferentially surrounding the containment vessel 200. In one embodiment, the heat sink space 313 is filled with liquid from the base mat 304 at the bottom end 314 of the concentric shells 310, 311 of the containment enclosure 300 to approximately the top end 315 of the concentric shells 310, 311 of the containment enclosure 300 to form an annular cooling water reservoir between the containment vessel 200 and the inner shell 310 of the containment enclosure 300. This annular reservoir may be coated or lined in some embodiments with a suitable corrosion resistant material such as aluminum, stainless steel, or a suitable preservative for corrosion protection. In one representative example, without limitation, the heat sink space 313 may be about 10 feet wide and about 100 feet high.

In one embodiment, the containment enclosure 300 includes a steel dome 316 that is suitably thick and reinforced to harden it against crashing aircraft and other incident projectiles. The dome 316 may be removably fastened to the shells 310, 311 by a robust flanged joint. In one embodiment, the containment vessel 200 is entirely surrounded on all exposed above grade portions by the containment enclosure 300, which preferably is sufficiently tall to provide protection for the containment vessel 200 against aircraft hazard or comparable projectile to preserve the structural integrity of the water mass in the heat sink space 313 surrounding the containment vessel 200. In one embodiment, the containment enclosure 300 extends vertically below grade to the top base mat 304.

The containment enclosure 300 may further include at least one rain-protected vent 317 which is in fluid communication with the heat sink space 313 and a head space 318 located between the dome 316 and the containment vessel 200 to allow water vapor to flow, escape, and vent to the atmosphere. Thus, in certain embodiments due to the vent 317 the containment enclosure 300 may be considered to have an open top end. In one embodiment, the vent 317 may be located at the center of the dome 316, although the invention is not to be so limited and the vent 317 can be otherwise located. In other embodiments, a plurality of vents may be provided spaced substantially radially around the dome 316. The vent 317 may be formed by a short section of piping in some embodiments which is covered by a rain hood of any suitable configuration that allows steam to escape from the containment enclosure 300 but minimizes the ingress of water.

In some embodiments, the head space 318 between the dome 316 and the containment vessel 200 may be filled with an energy absorbing material or structure to minimize the impact load on the dome 316 of the containment enclosure 300 from a crashing or falling projectile such as, for example without limitation, an airliner, a meteor or the like. In one example, a plurality of tightly-packed undulating or corrugated deformable aluminum plates may be disposed in part or all of the head space 318 to form a crumple zone which will help absorb and dissipate the impact forces on the dome 316.

In the exemplified embodiment, the containment structure 200 is an elongated vessel 202 including a hollow cylindrical shell 204 having a circular transverse cross-section, a top head 206, and a bottom head 208. In certain embodiments the containment vessel 200 may be considered a thermally conductive containment vessel in that the containment vessel 200 is formed of a thermally conductive material (i.e., metal or the like as discussed below) and can be used to transfer heat from the interior of the containment vessel 200 to the heat sink space 313. In one embodiment, the containment vessel 200 may be made from a suitably strong and ductile metallic plate and bar stock that is readily weldable, such as, for example without limitation, a low carbon steel. In one embodiment, the cylindrical shell 204 of the containment vessel 200 may be formed of a low carbon steel having a thickness of at least one inch. Other suitable metallic materials that can be used for the containment vessel 200 include without limitation various metallic alloys and the like.

In one embodiment, the weight of the containment vessel 200 may be primarily supported by the bottom slab 302 on which the containment vessel 200 rests and the containment enclosure 300 may be supported by the base mat 304 formed atop the sidewalls 303 of the foundation 301. Other suitable containment vessel 200 and containment enclosure 300 support arrangements may be used. In one embodiment, the bottom of the containment vessel 200 may include a ribbed support stand 208a or similar structure attached to the bottom head 208 to help stabilize and provide level support for the containment vessel on the slab 302 of the foundation 301.

Figure 3:
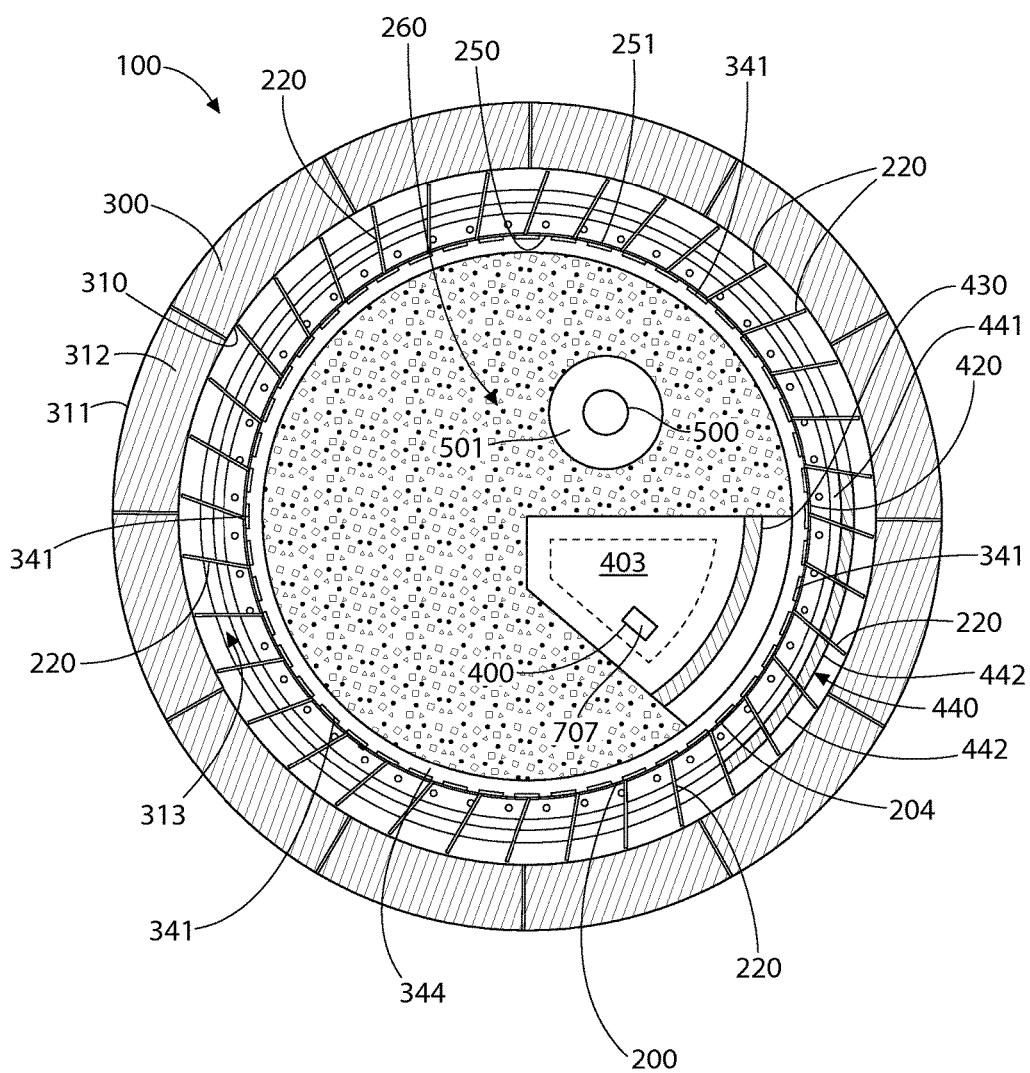
FIG. 3 is a cross-sectional view taken along line III-III of FIG. 2.
Figure 4:
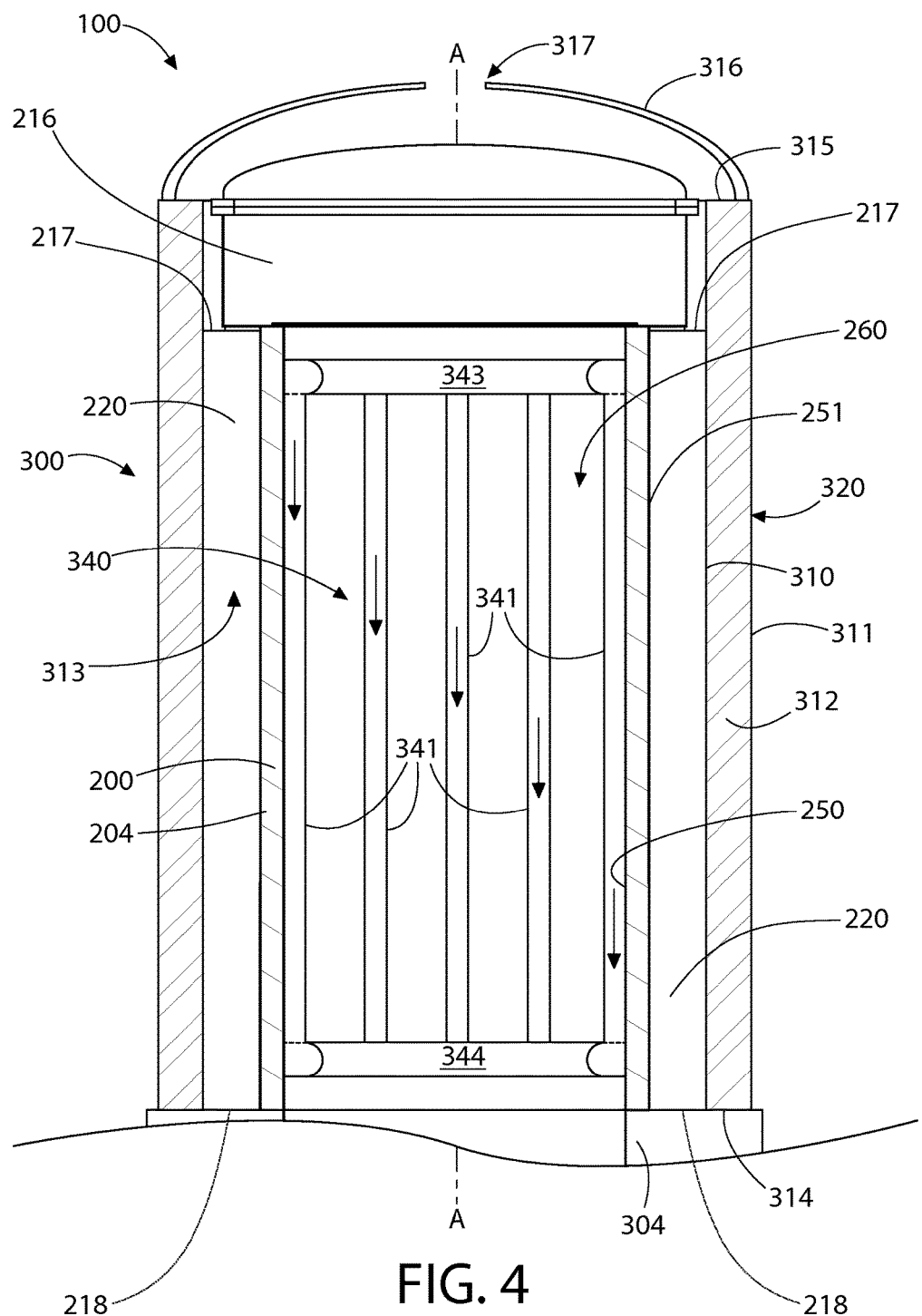
FIG. 4 is a cross-sectional view taken along line IV-IV of FIG. 2.

Referring now to FIGS. 3 and 4 concurrently, the invention will be further described. FIG. 3 illustrates a top cross-sectional view of the containment enclosure 300 and the containment vessel 200 and the heat sink space 313 therebetween and FIG. 4 illustrates a longitudinal cross-sectional view thereof. As noted above, the containment vessel 200 has an inner surface 250 and an outer surface 251, the inner surface 250 defining an interior cavity 260 of the containment vessel 200. In the exemplified embodiment, the containment vessel 200 has a plurality of heat exchange fins 220 extending from the outer surface 251 of the containment vessel 200 and into the liquid reservoir in the heat sink space 313. However, the invention is not to be so limited in all embodiments and in certain other embodiments the heat exchange fins 220 may be omitted. In the exemplified embodiment, the heat exchange fins 220 are spaced circumferentially around the perimeter of the shell 204 of the containment vessel 200 and extend substantially radially outwards from the containment vessel 200 into the heat sink space 313.

Referring solely to FIG. 3, the heat exchange fins 220 will be further described. The heat exchange fins 220, when used, serve multiple advantageous functions including without limitation: (1) stiffening the containment vessel 200; (2) preventing excessive "sloshing" of water in heat sink space 313 in the occurrence of a seismic event; and (3) acting as heat transfer "fins" to dissipate heat absorbed by conduction through the containment vessel 200 to the environment of the heat sink space 313.

Accordingly, in one embodiment to maximize the heat transfer effectiveness, the heat exchange fins 220 extend vertically for substantially the entire height of the heat sink space 313 covering the effective heat transfer surfaces of the containment vessel 200 (i.e. portions not buried in concrete foundation) to transfer heat from the containment vessel 200 to the liquid reservoir in the heat sink space 313. In one embodiment, the heat exchange fins 220 have upper horizontal ends 217 which terminate at or proximate to the underside or bottom of a top portion 216 of the containment vessel 200, and lower horizontal ends 218 which terminate at or proximate to the base mat 304 of the concrete foundation 301. In one embodiment, the heat exchange fins 220 may have a height which is equal to or greater than one half of a total height of the shell 204 of the containment vessel 200.

The heat exchange fins 220 may be made of steel (e.g. low carbon steel) or other suitable metallic materials including alloys which are each welded on one of the longitudinally-extending sides to the outer surface 251 of the containment vessel 200. The opposing longitudinally-extending side of each heat exchange fin 220 lies proximate to, but is not permanently affixed to the interior of the inner shell 310 of the containment enclosure 300 to maximize the heat transfer surface of the ribs acting as heat dissipation fins. Thus, the non-welded side of the heat exchange fins 220 is spaced from the inner shell 310 of the containment enclosure 300 by a small gap. In one embodiment, the heat exchange fins 220 extend substantially radially outwards beyond the top portion 216 of the containment vessel 200. In one representative example, without limitation, steel heat exchange fins 220 may have a thickness of about one inch. Other suitable thickness of fins may be used as appropriate. Accordingly, in some embodiments, the heat exchange fins 220 have a radial width that is more than 10 times the thickness of the heat exchange fins 220.

In one embodiment, the heat exchange fins 220 are oriented at an oblique angle to the containment vessel 200. This orientation forms a crumple zone extending 360 degrees around the circumference of the containment vessel 200 to better resist projectile impacts functioning in cooperation with the outer containment enclosure 300. Accordingly, an impact causing inward deformation of the inner and outer shells 310, 311 of the containment enclosure 300 will bend the heat exchange fins 220, which in the process will distribute the impact forces without direct transfer to and rupturing of the inner containment vessel 200 as might possibly occur with fins oriented 90 degrees to the containment vessel 200. In other possible embodiments, depending on the construction of the containment enclosure 300 and other factors, a perpendicular arrangement of the heat exchange fins 220 to the containment vessel 200 may be appropriate.

Referring to FIGS. 3-6 concurrently, the invention will be further described. The invention includes a passive heat exchange sub-system 340 that is fluidly coupled to a spent nuclear fuel pool 600 (see FIGS. 7 and 9, discussed in more detail below) that is housed within and enclosed by the containment vessel 200. The details of the operation of the passive heat exchange sub-system 340 will be discussed in more detail below with reference to FIGS. 7 and 9.

In the exemplified embodiment, the passive heat exchange sub-system 340 comprises, in part, at least one downcomer conduit 341, an inlet manifold 343 and an outlet manifold 344. In certain embodiments the inlet manifold 343 and the outlet manifold 344 may be omitted. In the exemplified embodiment, a plurality of the downcomer conduits 341 are illustrated being in intimate surface contact and therefore directly coupled to the inner surface 250 of the containment vessel 200. Furthermore, in certain embodiments the inlet and outlet manifolds 343, 344 may also be in intimate surface contact and directly coupled to the inner surface 250 of the containment vessel 200.

Figure 5:
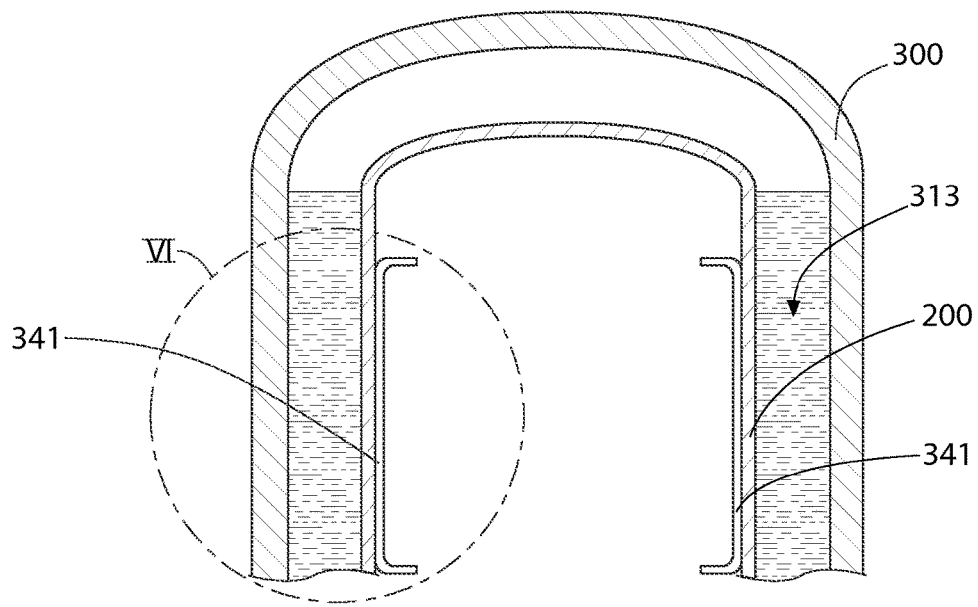
FIG. 5 is a schematic cross-sectional view through the containment enclosure and the containment vessel.
Figure 6:
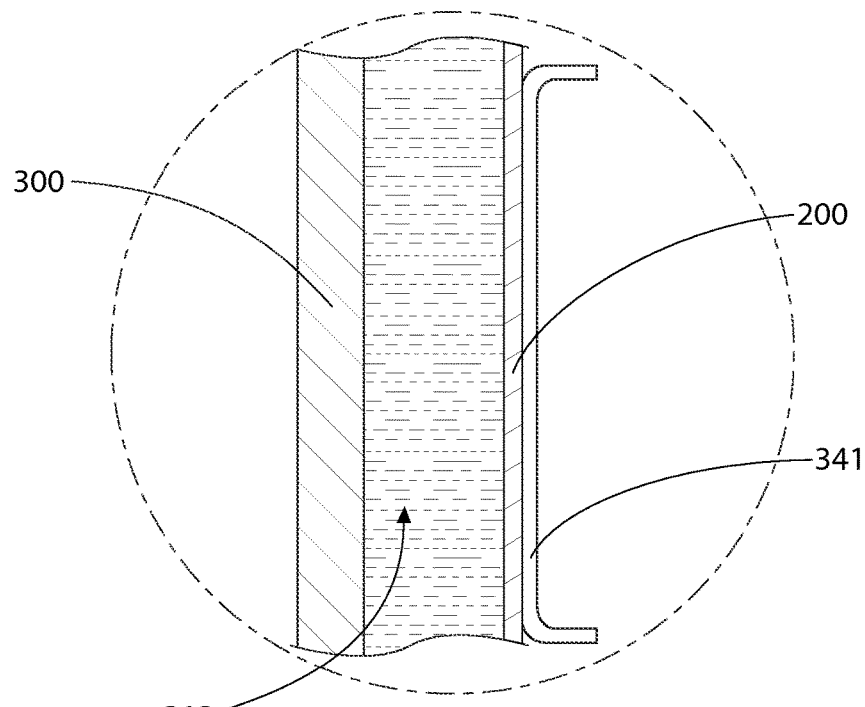
FIG. 6 is a close-up view of area VI of FIG. 5.

The downcomer conduits 341 may in certain embodiments be made of metal such as steel and be welded to the inner surface 250 of the containment vessel 200. In the exemplified embodiment, the plurality of downcomer conduits 341 are circumferentially spaced around the circumference of the containment vessel 200 and extend parallel to a longitudinal axis A-A of the containment vessel 200. As illustrated in FIGS. 5 and 6, in one embodiment the downcomer conduits 341 may be comprised of vertically oriented C-shaped structural channels (in cross section) positioned so that the parallel legs of the channels are each seam welded to the containment vessel 200 for their entire height to define a sealed vertical flow conduit. Other suitably shaped and configured downcomer conduits may be provided so long as the fluid conveyed in the downcomer conduits is in thermal cooperation with the heat sink space 313 to transfer heat to the heat sink space 313 as discussed in more detail below.

Although illustrated and described whereby the downcomer conduits 341 are coupled directly to the inner surface 250 of the containment vessel 200, the invention is not to be so limited in all embodiments. In certain embodiments the downcomer conduits 341 may be formed, partially or entirely, directly into the containment vessel 200 in between the inner and outer surfaces 250, 251 of the containment vessel 200. In such embodiments, the containment vessel 200 may have a thickness that is sufficient to support the downcomer conduits 341 between the inner and outer surfaces 250, 251 thereof. Thus, the downcomer conduits 341 may be ducts or passageways that extend vertically through the body of the containment vessel 200 in between the inner and outer surfaces 250, 251 thereof.

In the exemplified embodiment, each of the downcomer conduits 341 is fluidly coupled to both the inlet manifold 343 and the outlet manifold 344 and extends between the inlet manifold 343 and the outlet manifold 344. In the exemplified embodiment, each of the inlet and outlet manifolds 343, 344 is an annular structure that is fluidly connected to each of the downcomer conduits 341. In the exemplified embodiment, the inlet and outlet manifolds 343, 344 are vertically spaced apart and positioned at suitable elevations on the inner surface 250 of the containment vessel 200 to maximize the transfer of heat between fluid flowing vertically inside the downcomer conduits 341 and the containment vessel 200 in the active heat transfer zone defined by portions of the containment vessel 200 having the external longitudinal fins 220 and/or surrounded by the heat sink space 313. To take advantage of the liquid reservoir in the heat sink space 313 for heat transfer, the inlet and outlet manifolds 343, 344 may each respectively be located on the inner surface 250 of the containment vessel 200 adjacent and near to the top and bottom of the heat sink space 313.

In one embodiment, the inlet and outlet manifolds 343, 344 may each be formed of half-sections of steel pipe which are welded directly to the inner surface 250 of the containment vessel 200. In other embodiments, the inlet and outlet manifolds 343, 344 may be formed of complete sections of arcuately curved piping supported by and attached to the inner surface 250 of the containment vessel 200 by any suitable means. In still other embodiments, the inlet and outlet manifolds 343, 344 may be formed directly into the containment vessel 200 in the space between the inner and outer surfaces 250, 251 of the containment vessel 200. In further embodiments, the inlet and outlet manifolds 343, 344 may be directly coupled to the downcomers 341 but may be spaced from the inner surface 250 of the containment vessel 200.

In certain embodiments, some of the downcomer conduits 341 may be connected to the inlet and outlet manifolds 343, 344 while others of the downcomer conduits 341 may not be connected to the inlet and outlet manifolds 343, 344 so that various downcomer conduits 341 can play different roles in the passive cooling of the interior of the containment vessel 200. Due to the coupling of the downcomer conduits 341 to the inlet and outlet manifolds 343, 344 in the exemplified embodiment, any air, liquid or fluid that enters into the inlet manifold 343 (as discussed in detail below with reference to FIGS. 7 and 9) will flow downwardly through the downcomer conduits 341, and heat will be transferred from the air, liquid or fluid flowing through the downcomer conduits 341 into the heat sink space 313 to thereby cool the air, liquid or fluid flowing through the downcomer conduits 341. Thus, the downward pointing arrows in each of the downcomer conduits 341 depicted in FIG. 4 illustrate the direction of flow of air, liquid or fluid that flows through the downcomer conduits 341 during passive spent nuclear fuel pool cooling operations, as discussed in more detail below with reference to FIGS. 7 and 9.

Any suitable number and arrangement of downcomer conduits 341 may be provided depending on the heat transfer surface area required for cooling the fluid flowing through the downcomer conduits 341. The downcomer conduits 341 may be uniformly or non-uniformly spaced on the inner surface 250 of the containment vessel 200, and in some embodiments grouped clusters of downcomer conduits 341 may be circumferentially distributed around the containment vessel 200. The downcomer conduits 341 may have any suitable cross-sectional dimensions depending on the flow rate of fluid carried by the ducts and heat transfer considerations.

Figure 7:
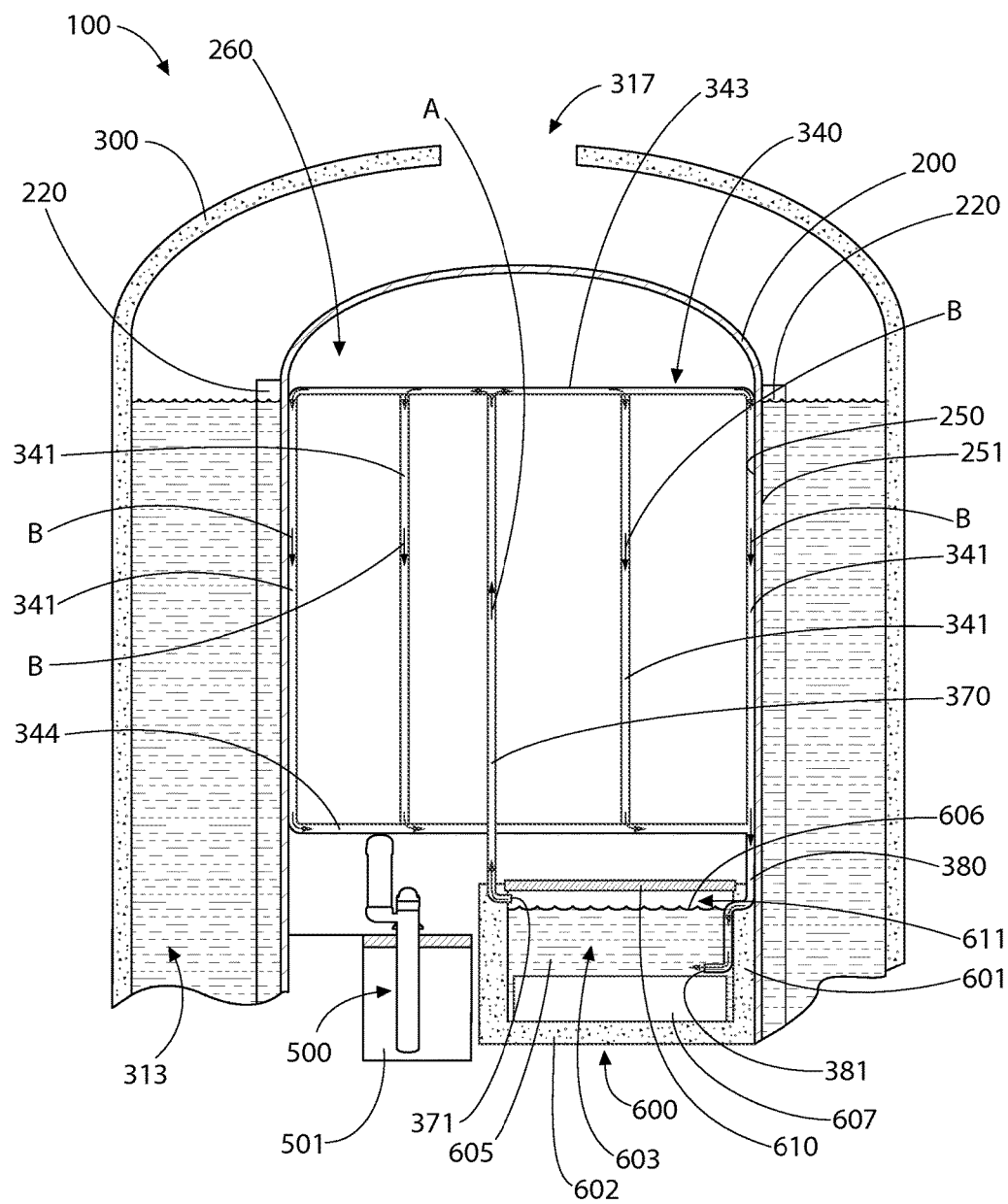
FIG. 7 is a schematic view of a generalized cross-section of a portion of the nuclear reactor containment enclosure and the containment vessel of FIG. 2 depicting a spent nuclear fuel pool and a nuclear reactor therein.

Referring now to FIG. 7, one embodiment of the interior of the containment enclosure 300 and the containment vessel 200 will be described. The containment vessel 200 encloses and houses a nuclear reactor 500 and a spent nuclear fuel pool 600. The reactor comprising a reactor vessel is disposed in a water-filled hotwell 501, whose use and design are well known in the art without further elaboration. The passive heat exchange sub-system 340 is coupled to the inner surface 250 of the containment vessel 200 in the manner described above, although certain conduits of the passive heat exchange sub-system 340 can be formed directly into the containment vessel 200 as discussed above. The passive heat exchange sub-system 340 is also fluidly coupled to the spent nuclear fuel pool 600 to passively cool the spent nuclear fuel pool 600 as discussed in detail below.

The spent nuclear fuel pool 600 comprises a peripheral sidewall 601 and a floor 602 that collectively define an interior cavity 603. In the exemplified embodiment, the peripheral sidewall 601 and the floor 602 of the spent nuclear fuel pool 600 are formed of concrete, although other materials commonly used for spent nuclear fuel pool construction can be used in other embodiments. A body of liquid water 605 having a surface level 606 is positioned within the spent nuclear fuel pool 600, and more specifically the body of liquid water 605 fills the interior cavity 603 of the spent nuclear fuel pool 600. Furthermore, at last one spent nuclear fuel rod 607 is submerged in the body of liquid water 605. The at least one spent nuclear fuel rod 607 has a high heat and therefore heats the body of liquid water 605 within the spent nuclear fuel pool 600. The passive heat exchange sub-system 340 is used to passively cool the body of liquid water 605 within the spent nuclear fuel pool 600 to prevent the body of liquid water 605 from boiling and evaporating, which would result in an undesirable situation whereby the spent nuclear fuel rod(s) 607 are exposed above the surface level 606 of the body of liquid water 605.

In the exemplified embodiment, the spent nuclear fuel pool 600 is covered with a lid 610. Covering the spent nuclear fuel pool 600 with the lid 610 forms a hermetically sealed vapor space 611 between the surface level 606 of the body of liquid water 605 and the lid 610. The vapor space 611 is an air-filled space between the surface level 606 of the body of liquid water 605 and the lid 610. The vapor space 611 becomes filled with vapor or evaporated water from the body of liquid water 605 as the body of liquid water 605 becomes heated by the spent nuclear fuel rod(s) 607 submerged therein. The use of the lid 610 prevents the deposition of dirt and debris into the body of liquid water 605 thereby reducing the need for or frequency of using a pool clean-up system. Furthermore, the lid 610 prevents humidity from the spent nuclear fuel pool 600 (i.e., the water vapor in the vapor space 611) from entering into the interior cavity 260 of the containment vessel 200 and thereby reduces the HVAC burden in the interior cavity 260 of the containment vessel 200 and increases habitability of the interior cavity 260 of the containment vessel 200 by operators/workers. Furthermore, in certain embodiments the lid 610 can be designed having a flat top to enable the lid 610 to serve as a working area or equipment lay down area inside of the containment vessel 200.

The lid 610 can be formed of any desired material, including without limitation concrete, metal, metallic alloys, wood or the like. The lid 610 need not shield radiation in all embodiments because radiation shielding, to the extent that such is necessary, is generally achieved by the body of liquid water 605. Rather, the lid 610 is intended to create the hermetically sealed vapor space 611 between the lid 610 and the surface level 606 of the body of liquid water 605. Any material capable of achieving such a hermetically sealed vapor space 611 can be used for the lid 610.

As noted above, the passive heat exchange sub-system 340 is fluidly coupled to the spent nuclear fuel pool 600. More specifically, the passive heat exchange sub-system 340 is fluidly coupled to both the vapor space 611 and to the body of liquid water 605 of the spent nuclear fuel pool 600. As noted above, the passive heat exchange sub-system 340 comprises the downcomer conduits 341, the inlet manifold 343 and the outlet manifold 344. Furthermore, the passive heat exchange sub-system 340, in the exemplified embodiment, also includes a riser conduit 370 and a return conduit 380. As will be discussed in detail below, the passive heat exchange sub-system 340 is configured to receive water vapor from the vapor space 611, remove thermal energy from the received water vapor, thereby condensing the water vapor, and return the condensed water vapor to the body of liquid water 605. As a result, the water vapor does not affect the humidity inside of the interior cavity 260 of the containment vessel 200 because it remains trapped in the hermetically sealed vapor space 611 and then flows through the passive heat exchange sub-system 340 without entering into the interior cavity 260 of the containment vessel 200. Furthermore, due to the flow of the water vapor and condensed water vapor through the passive heat exchange sub-system 340, the spent nuclear fuel pool 600, and specifically the body of liquid water 605 therein, is passively cooled.

As will be discussed in more detail below, the passive heat exchange sub-system 340 comprises or forms a closed-loop fluid flow circuit. Specifically, water vapor flows from the spent nuclear fuel pool 700 (specifically from the vapor space 611 of the spent nuclear fuel pool 700) into the riser conduit 370, from the riser conduit 370 into the inlet manifold 343, from the inlet manifold into the downcomers 341, from the downcomers 341 into the outlet manifold 344, from the outlet manifold into the return conduit 380, and from the return conduit 380 back into the spent nuclear fuel pool 700 (specifically into the body of liquid water 705 within the spent nuclear fuel pool 700). Thus, the passive heat exchange sub-system 340 forms a closed-loop fluid flow circuit that takes heated vapor water from the spent nuclear fuel pool 700, cools the heated vapor water to form a cooled condensed water vapor, and reintroduces the cooled condensed water vapor back into the spent nuclear fuel pool 700 to passively cool the body of liquid water 700 within the spent nuclear fuel pool 700. The details of this system and the fluid flow through the system will be discussed in detail below.

In the exemplified embodiment, the riser conduit 370 of the passive heat exchange sub-system 340 has an inlet 371 that is located within the vapor space 611. Furthermore, the return conduit 380 of the passive heat exchange sub-system 340 has an outlet 381 that is located within the body of liquid water 605. Thus, as the body of liquid water 605 becomes heated by the spent fuel rods 607, the vapor space 611 becomes filled with hot vapor water. The vapor water will flow into the passive heat exchange sub-system 340 through the inlet 371 of the riser conduit 370. The vapor water will then flow upwards within the riser conduit 370 in the direction indicated by the arrow A.

Although the downcomer conduits 341 have been described above as being coupled to or in intimate surface contact (i.e., conformal surface contact) with the inner surface 250 of the containment vessel 200, in certain embodiments the riser conduit 370 is not similarly coupled to the containment vessel 200. Rather, it is desirable to ensure that the water vapor that flows through the riser conduit 370 retains its thermal energy while within the riser conduit 370 so that the water vapor does not cool as it rises within the riser conduit 370. By retaining the thermal energy of the water vapor while the water vapor flows through the riser conduit 370, thermosiphon flow can be facilitated by ensuring that the hot water vapor rises within the riser conduit 370 and then cools within the downcomer conduits 341. Thus, in certain embodiments the riser conduit 370 is spaced from the inner surface 250 and other surfaces of the containment vessel 200 so that the riser conduit 370 is not in thermal cooperation with the heat sink (i.e., the heat sink space 313). In certain embodiments, the riser conduit 370 may also include a thermal insulating layer. Such a thermal insulating layer will further ensure that the vapor water does not condense as it flows upwardly within the riser conduit 370 by trapping the thermal energy of the water vapor within the riser conduit 370 as the water vapor flows upwardly within the riser conduit 370.

However, the invention is not to be limited by the above in all embodiments and in certain other embodiments it may be desirable to condense the water vapor as the water vapor rises within the riser conduit 370. In such embodiments the riser conduit 370 may be coupled to or in intimate surface contact with the inner surface 250 of the containment vessel 200. Alternatively, the thermal insulating layer may be omitted and the water vapor may condense as it rises due to natural thermal energy transfer and natural cooling that occurs over time due to the temperature in the interior cavity 260 of the containment vessel 200 being less than the temperature of the water vapor within the riser conduit 370.

The vapor water will continue to flow within the riser conduit 370 in the direction of the arrow A until it is fed into the inlet manifold 343. In the exemplified embodiment, the inlet manifold 343 fluidly couples the riser conduit 370 to the one or more downcomer conduits 341. Thus, after entering into the inlet manifold 343, the vapor water will flow out of the inlet manifold 343 and into the one or more downcomer conduits 341. As noted above, the downcomer conduits 341 in certain embodiments are coupled directly to the inner surface 250 of the containment vessel 200. As a result, the downcomer conduits 341 are in thermal cooperation with the heat sink created by the liquid reservoir in the heat sink space 313. Due to this thermal cooperation between the downcomer conduits 341 and the heat sink, thermal energy is transferred from the water vapor carried within the downcomer conduits 341 outwardly to the heat sink (i.e., to the liquid reservoir in the heat sink space 313). Specifically, the thermal energy from the water vapor is transferred to the heat sink through the one or more downcomer conduits 341 and through the containment vessel 200. Thus, the heat sink space 313 and the liquid reservoir therein serves as the heat sink for the decay heat in the spent nuclear fuel pool 6000 by rejecting the heat from the water vapor that flows within the downcomer conduits 341 to the environment by natural evaporation. As the thermal energy is transferred from the water vapor to the heat sink, the water vapor condenses in the downcomer conduits 341, cools, and forms a condensed water vapor.

The thermal energy transfer from the vapor water to the heat sink facilitates the natural, passive thermosiphon flow of the water vapor through the passive heat exchange sub-system 340. Specifically, the hot water vapor rises within the riser conduit 370 and cools within the downcomer conduits 341. The hot water vapor will continually flow through the riser conduits 370 and continue to passively push the water vapor through the closed-loop fluid circuit of the passive heat exchange sub-system 340.

After the water vapor condenses within the downcomer conduits 341 to form condensed water vapor (i.e., liquid water), the condensed water vapor continues to flow downwardly within the downcomer conduits 341 in the direction of the arrows B. In some embodiments, this downward flow of the condensed water vapor can be achieved by gravity action. The condensed water vapor flows from the downcomer conduits 341 and into the outlet manifold 343. The outlet manifold 344 fluidly couples the downcomer conduits 341 to the return conduit 380. Thus, from the outlet manifold 343 the condensed water vapor flows into the return conduit 380, through the return conduit 380, and out through the outlet 381 of the return conduit 380 into the body of liquid water 605. The condensed water vapor mixes with the body of liquid water 605 in the spent nuclear fuel pool 600.

In some embodiments, the condensed water vapor has a temperature that is lower than the average temperature of the body of liquid water 605 within the spent nuclear fuel pool 600 due to the thermal energy transfer discussed above. The hot water vapor is continually removed from the spent nuclear fuel pool 600 and reintroduced into the spent nuclear fuel pool 600 as cooled condensed water vapor. Thus, using the passive heat exchange sub-system 340, the spent nuclear fuel pool 600, and more specifically the body of liquid water 605 within the spent nuclear fuel pool 600, can be passively cooled by flowing the hot water vapor out of the spent nuclear fuel pool 600 and returning the cooled condensed water vapor back into the body of liquid water 605. The passive heat exchange sub-system 340 facilitates thermosiphon flow of the water vapor as discussed above without the use of any pumps or motors.

In certain embodiments, the air in the vapor space 611 can be partially evacuated (i.e., vacuumed) to a sub-atmospheric pressure so that the evaporation temperature of the body of liquid water 605 is lowered to between about 120° F. and 180° F., more specifically between about 135° F. and 165° F., and still more specifically to about 150° F. Evacuating the air in the vapor space 611 ensures that the vapor space remains filled with vapor water so that the thermosiphon flow of the water vapor through the passive heat exchange sub-system 340 can be achieved. Yet in certain other embodiments, the air in vapor space 611 may be at atmospheric or above atmospheric pressure.

Figure 8:
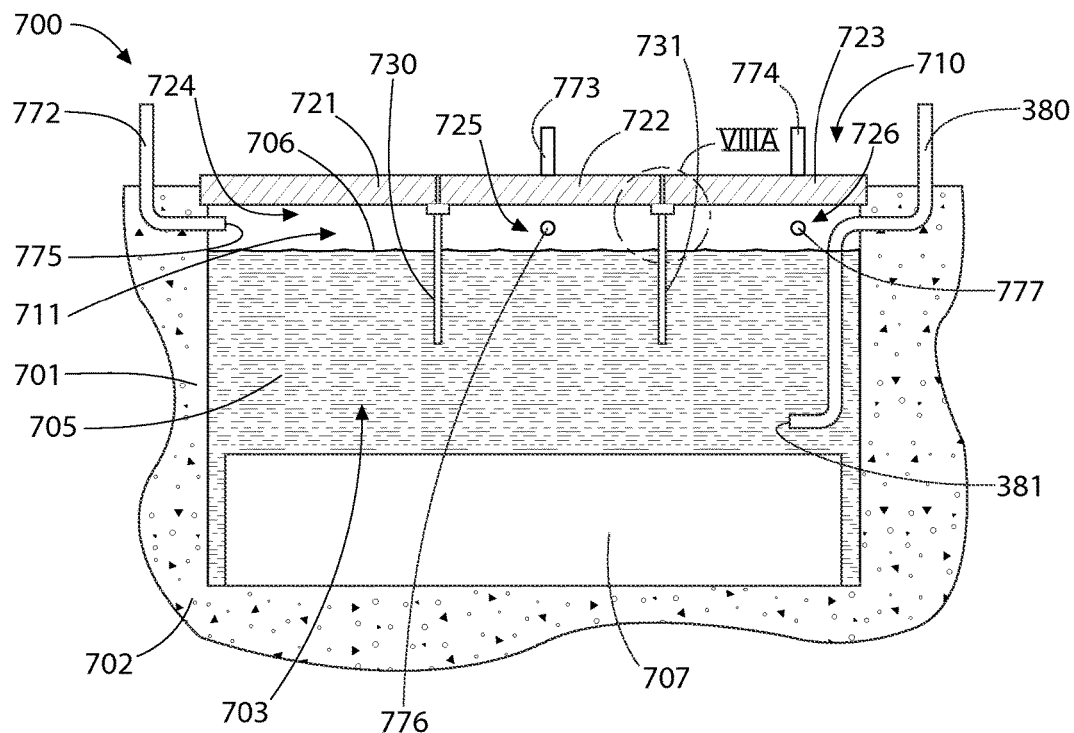
FIG. 8 is a schematic view of a cross-section of a spent nuclear fuel pool in accordance with an embodiment of the present invention.
Figure 9:
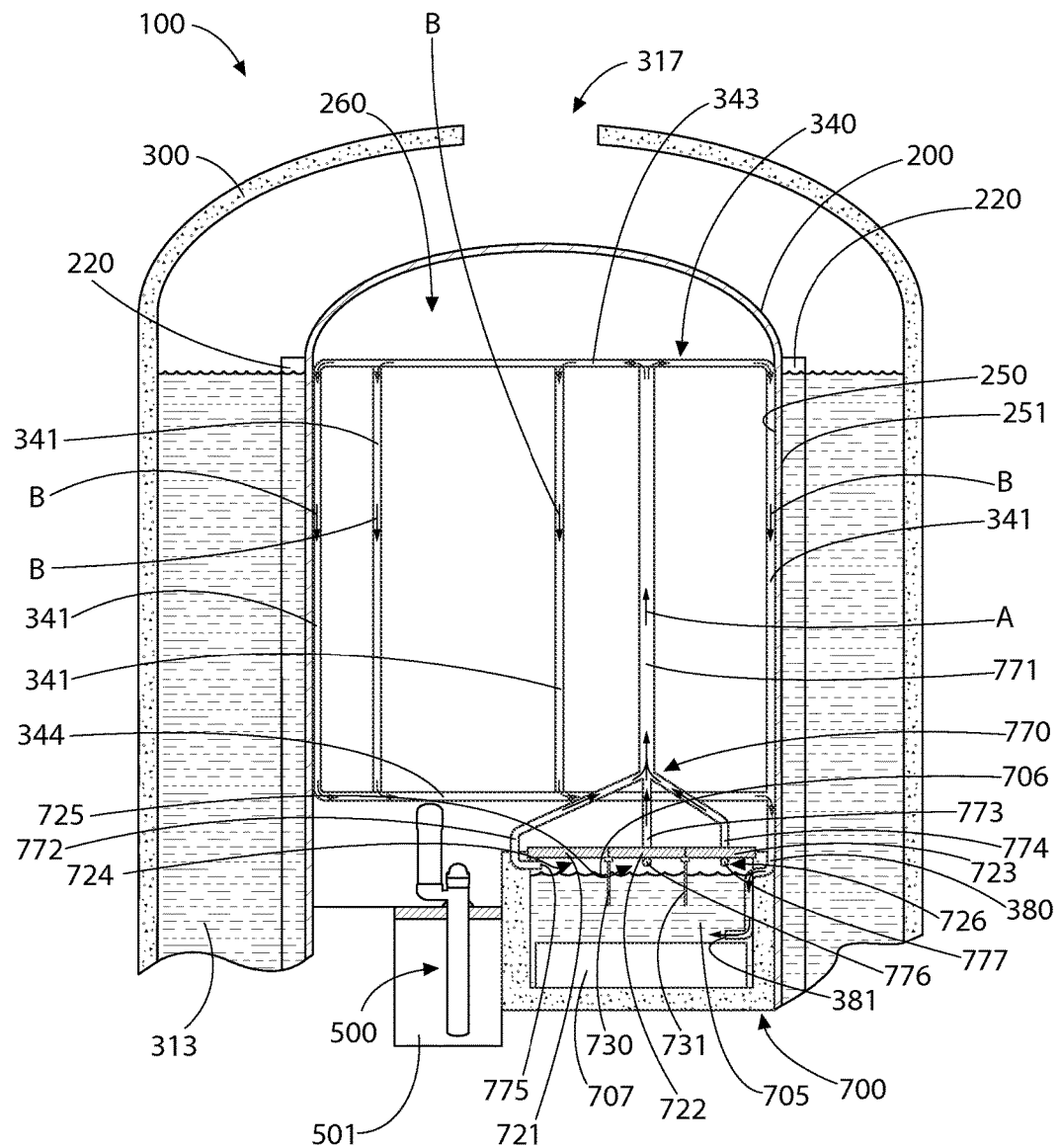
FIG. 9 is a schematic view of a generalized cross-section of a portion of a nuclear reactor containment enclosure and containment vessel in accordance with another embodiment of the present invention whereby the spent nuclear fuel pool of FIG. 8 is contained within the containment vessel.

Referring now to FIGS. 8 and 9, a spent nuclear fuel pool 700 will be described in accordance with another embodiment of the present invention. Certain features of the spent nuclear fuel pool 700 are similar to features described above with regard to the spent nuclear fuel pool 600. Those similar features will be similarly numbered except that the 700-series of numbers will be used.

The spent nuclear fuel pool 700 comprises a peripheral sidewall 701 and a floor 702 that collectively define an interior cavity 703. A body of liquid water 705 having a surface level 706 is positioned in the spent nuclear fuel pool 700 within the interior cavity 703. At least one spent nuclear fuel rod 707 is submerged in the body of liquid water 705. Because the spent nuclear fuel rod 707 is extremely hot, the spent nuclear fuel rod 707 heats the body of liquid water 705. Thus, the body of liquid water 705 is, in certain embodiments, continuously cooled to remove the heat produced by the spent nuclear fuel rod(s) 707 by using the passive heat exchange sub-system 340, as will be discussed in more detail below.

In the exemplified embodiment, a lid 710 covers the spent nuclear fuel pool 700 and forms a hermetically sealed vapor space 711 between the surface level 706 of the body of liquid water 705 and the lid 710. In the exemplified embodiment, the lid 710 comprises a first lid section 721, a second lid section 722 and a third lid section 723 that collectively cover the entire spent nuclear fuel pool 700. Although three different lid sections are illustrated in the exemplified embodiment, the invention is not to be so limited in all embodiments. Thus, the lid 710 may include only two lid sections or the lid 710 may include more than three lid sections in other embodiments. The number of lid sections in certain embodiments corresponds with the number of dividers as discussed below (there will be one more lid section than there are dividers in certain embodiments).

Furthermore, in the exemplified embodiment a first divider 730 extends from the lid 710 a partial distance into the body of liquid water 705 and a second divider 731 extends from the lid 710 a partial distance into the body of liquid water 705. Each of the dividers 730, 731 is a partial depth wall that extends a partial depth into the body of liquid water 705. The dividers 730, 731 can be formed of any desired material such as metal, metal alloys, concrete and the like. The first divider 730 extends from the lid 710 at a position between the first and second lid sections 721, 722 and into the body of liquid water 705 and the second divider 731 extends from the lid 710 at a position between the second and third lid sections 722, 723 and into the body of liquid water 705. The dividers 730, 731 may be directly coupled to the lid 710 in certain embodiments such as by welding, adhesive, fasteners or the like, or may be indirectly coupled to the lid 710 by intervening structures. Although two dividers are illustrated in the exemplified embodiment, the invention is not to be so limited. Thus, in certain other embodiments there may only be one divider, or there may be more than two dividers. In certain embodiments, if one divider is used, then the lid has two lid sections, if two dividers are used, then the lid has three lid sections, if three dividers are used, then the lid has four lid sections and so on.

Each of the first and second dividers 730, 731 extends from the lid 710 and into the body of liquid water 705, but not all the way to the floor of the spent nuclear fuel pool 700. In certain embodiments, each of the dividers 730, 731 extends to between approximately ⅓ and ⅕ of a depth of the body of liquid water 705, and more specifically to between approximately ¼ of a depth of the body of liquid water 705. Thus, if the spent nuclear fuel pool 700 has a depth of forty feet, each of the first and second dividers 730, 731 may extend to between 8 and 13 feet into the body of liquid water 705, or more specifically to approximately 10 feet into the body of liquid water 705. Of course, depths of extension of the first and second dividers 730, 731 can be greater or less than that noted above and the invention is not to be limited by the depth of extension of the dividers 730, 731 into the body of liquid water 705 unless specifically recited in the claims.

Because the first and second dividers 730, 731 only extend partially into the body of liquid water 705, the body of liquid water 705 is able to flow beneath the first and second dividers 730, 731. Thus, the entire body of liquid water 705 can flow freely within the spent nuclear fuel pool 700 without any restrictions. However, the first and second dividers 730, 731 divide the vapor space 711 into a first vapor space section 724 located between the first lid section 721 and the surface level 706 of the body of liquid water 705, a second vapor space section 725 located between the second lid section 722 and the surface level 706 of the body of liquid water 705, and a third vapor space section 726 located between the third lid section 723 and the surface level 706 of the body of liquid water 705. Each of the first, second and third vapor space sections 724, 725, 726 are hermetically isolated from one another by the dividers 730, 731 and by the lid sections 721, 722, 723 so that water vapor in the first vapor space section 724 cannot flow into the second or third vapor space sections 725, 726, water vapor in the second vapor space section 725 cannot flow into the first or third vapor space sections 724, 726, and water vapor in the third vapor space section 726 cannot flow into the first or second vapor space sections 724, 725.

Figure 8A:
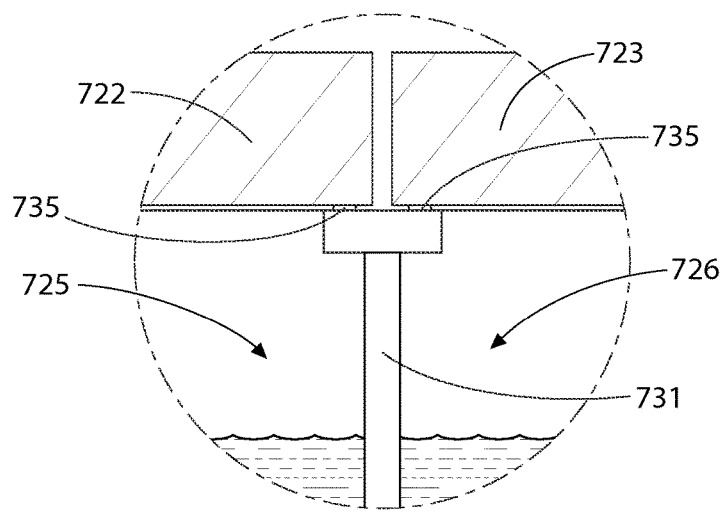
FIG. 8A is a close-up view of area VIIIA of FIG. 8.

In the exemplified embodiment, a gasket 735 is coupled to each of the first, second and third lid sections 721, 722, 723 (see FIG. 8A). The gasket 735 may be an annular rubber gasket or any other type of known gasket that facilitates the creation of the hermetically sealed vapor space sections 724, 725, 726. Thus, the spent fuel pool 700 is covered by a set of heavy lid sections 721, 722, 723 with peripheral seals so that the space (i.e., the vapor space sections 724, 725, 726 underneath the lid sections 721, 722, 723) is sequestered from the ambient environment above the lid sections 721, 722, 723.

In the exemplified embodiment, water vapor from each of the first, second and third vapor space sections 724, 725, 726 can be introduced into the passive heat exchange sub-assembly 340. In that regard, a riser pipe 770 (see FIG. 9)

that carries the water vapor from the spent nuclear fuel pool 700 to the downcomer conduits 341 comprises a primary riser section 771 (see FIG. 9), a first riser inlet section 772, a second riser inlet section 773 and a third riser inlet section 774. In the exemplified embodiment, each of the first, second and third riser inlet sections 772, 773, 774 extends into and through the concrete peripheral sidewall 701 of the spent nuclear fuel pool 700. This arrangement enables each of the lid sections 721, 722, 723 to be removed/opened without affecting the intake/return piping of the passive heat exchange sub-system 340.

The first riser inlet section 772 has a first inlet 775 positioned within the first vapor space section 724, the second riser inlet section 773 has a second inlet 776 positioned within the second vapor space section 725, and the third riser inlet section 774 has a third inlet 777 positioned within the third vapor space section 726. Thus, each of the first, second and third inlets 775, 776, 777 is located above the surface level 706 (i.e., the maximum water surface) of the body of liquid water 705 within a respective one of the vapor space sections 724, 725, 726. The flow of the water vapor from each of the first, second and third vapor space sections 724, 725, 726 through the passive heat exchange sub-system 340 will be discussed in more detail below with reference to FIG. 9.

Furthermore, as discussed above the passive heat exchange sub-system 340 comprises a return conduit 380. In the exemplified embodiment, the return conduit 380 extends through the concrete sidewall 701 of the spent nuclear fuel pool 700. The return conduit 380 terminates at an outlet 381 that is located within the body of liquid water 705. Although only one return conduit 380 is illustrated in the exemplified embodiment, more than one return conduit 380 can be used in other embodiments, such as having one return conduit for each vapor space section.

In certain embodiments, the air in each of the first, second and third vapor space sections 724, 725, 726 can be partially evacuated to a sub-atmospheric pressure, such as by vacuuming the air out of the vapor spaces 724, 725, 726, so that the evaporation temperature of the body of liquid water 705 is lowered to between about 120° F. and 180° F., more specifically between about 135° F. and 165° F., and still more specifically to about 150° F. Evacuating the air in the vapor space sections 724, 725, 726 ensures that the vapor space sections 724, 725, 726 remain filled with vapor water so that the thermosiphon flow of the water vapor through the passive heat exchange sub-system 340 can be achieved. Yet in certain other embodiments, the air in vapor space 611 may be at atmospheric or above atmospheric pressure.

Using the inventive spent nuclear fuel pool 700, any one of the lid sections 721, 722, 723 can be separately removed from the spent nuclear fuel pool 700 as desired for installing or removing a new fuel cartridge or fuel assembly into the spent nuclear fuel pool 700. When it is desired to remove one of the lid sections 721, 722, 723, first the pressure within the particular vapor space section 724, 725, 726 that is covered by the lid section 721, 722, 723 to be removed is equalized to ambient. Then, the lid section 721, 722, 723 is removed. While one of the lid sections 721, 722, 723 is removed for fuel management activity, the other lid sections 721, 722, 723 will remain covering the spent nuclear fuel pool 700. Thus, if, for example without limitation, the first lid section 721 is removed, the second and third lid sections 722, 723 will remain in place. Thus, the second and third vapor space sections 725, 726 will continue to be hermetically sealed vapor spaces, and the second and third riser inlet sections 773, 774 will continue to receive water vapor from the second and third vapor space sections 725, 726 and flow the received water vapor through the passive heat exchange sub-system 340. Thus, in certain embodiments the pool cooling system will continue to work at all times, even during fuel management activity, unaided by any motors or pumps.

Referring solely to FIG. 9, flow of the water vapor through the passive heat exchange sub-system 340 when the passive heat exchange sub-system is fluidly coupled to the spent nuclear fuel pool 700 will be described. Because each of the first, second and third vapor space sections 724, 725, 726 are hermetically isolated from one another, an inlet 775, 776, 777 of one of the riser inlet sections 772, 773, 774 is positioned within a respective one of each of the first, second and third vapor space sections 724, 725, 726. In the exemplified embodiment, each of the first, second and third riser inlet sections 772, 773, 774 converge into the primary riser section 771 so that water vapor that flows through each of the first, second and third riser inlet sections 772, 773, 774 will converge in the primary riser section 771. The primary riser section 771 of the riser conduit 770 is fluidly coupled to the one or more downcomers 341 by the inlet conduit 343. More specifically, the primary riser section 771 of the riser conduit 770 is fluidly coupled to the inlet conduit 343, and the inlet conduit 343 is fluidly coupled to the downcomers 341.

Although in the exemplified embodiment the first, second and third riser inlet sections 772, 773, 774 converge into the primary riser section 771, the invention is not to be so limited in all embodiments. In certain other embodiments each of the first, second and third riser inlet sections 772, 773, 774 may extend separately from one of the vapor space sections 724, 725, 726 to the inlet conduit 343. Thus, the primary riser section 771 may be omitted and the first, second and third riser inlet sections 772, 773, 774 may not converge, but may instead each separately carry water vapor from the vapor space sections 724, 725, 726 to the inlet manifold 343 for dispersion into the downcomers 341.

Each of the primary riser section 771 and the first, second and third riser inlet sections 772, 773, 774 may include a thermal insulating layer to prevent thermal energy from leaving the water vapor while the water vapor is flowing within the riser conduit 770. Furthermore, each of the primary riser section 771 and the first, second and third riser inlet sections 772, 773, 774 may be spaced apart from the inner surface 250 of the containment vessel 200 to prevent the transfer of thermal energy from the water vapor to the heat sink while the water vapor is flowing within the riser conduit 770.

As noted above, the inlet manifold 343 is in fluid communication with the downcomers 341. Thus, the water vapor flows from the riser conduit 770 upwardly to the inlet manifold 343, where the water vapor then flows into the downcomers 341 and downwardly within the downcomers 341. As discussed above, in certain embodiments the downcomers 341 are in intimate surface contact or otherwise coupled to the inner surface 250 of the containment vessel 200. Thus, as the water vapor flows within the downcomers 341, thermal energy is transferred from the water vapor, through the downcomers 341, through the containment vessel 200 and into the heat sink (i.e., into the liquid reservoir within the head sink space 313). This thermal energy transfer cools and condenses the water vapor and turns the water vapor into a condensed water vapor.

The condensed water vapor then continues to flow downwardly through the downcomers 341 by gravity action. The condensed water vapor flows into the outlet manifold 344, and then from the outlet manifold 344 into the return conduit 380. From the return conduit 380, the condensed water vapor flows through the outlet 381 and into the body of liquid water 705. Thus, using the passive heat exchange sub-system 340, the body of liquid water 705 in the spent nuclear fuel pool 700 can be passively cooled by flowing heated vapor water out of the spent nuclear fuel pool 700 and flowing cooled condensed water vapor back into the spent nuclear fuel pool 700.

In certain embodiments, the present invention can be directed to a method of passively cooling a spent nuclear fuel pool using the components discussed herein above. The operation of the system has been discussed in detail above, and the method is achieved by the inventive system. Specifically, using the system components discussed above, the inventive system can passively cool a spent nuclear fuel pool, and thus the invention can be a method of passively cooling a spent nuclear fuel pool.

Unless otherwise specified, the components described herein may generally be formed of a suitable material appropriate for the intended application and service conditions. All conduits and piping are generally formed from nuclear industry standard piping. Components exposed to a corrosive or wetted environment may be made of a corrosion resistant metal (e.g. stainless steel, galvanized steel, aluminum, etc.) or coated for corrosion protection.

Supplemental Non-Evaporative Cooling Features of the Spent Fuel Pool

In addition to the passive heat exchange sub-system described herein which cools the spent fuel pool via evaporative cooling and natural gravity-driven flow circuits, supplemental cooling of the body of water in the spent fuel pool is provided by heat transfer features which utilize convective and conductive processes to lower the temperature of the water, thereby not only cooling the body of water but reducing the rate of evaporation. Moreover, these heat transfer features serve as a passive heat exchange back-up mechanism for the heat exchange sub-system in the event that sub-system becomes unavailable for some reason. Therefore, cooling of spent fuel pool may continue for at least a limited period of time.

Figure 10:
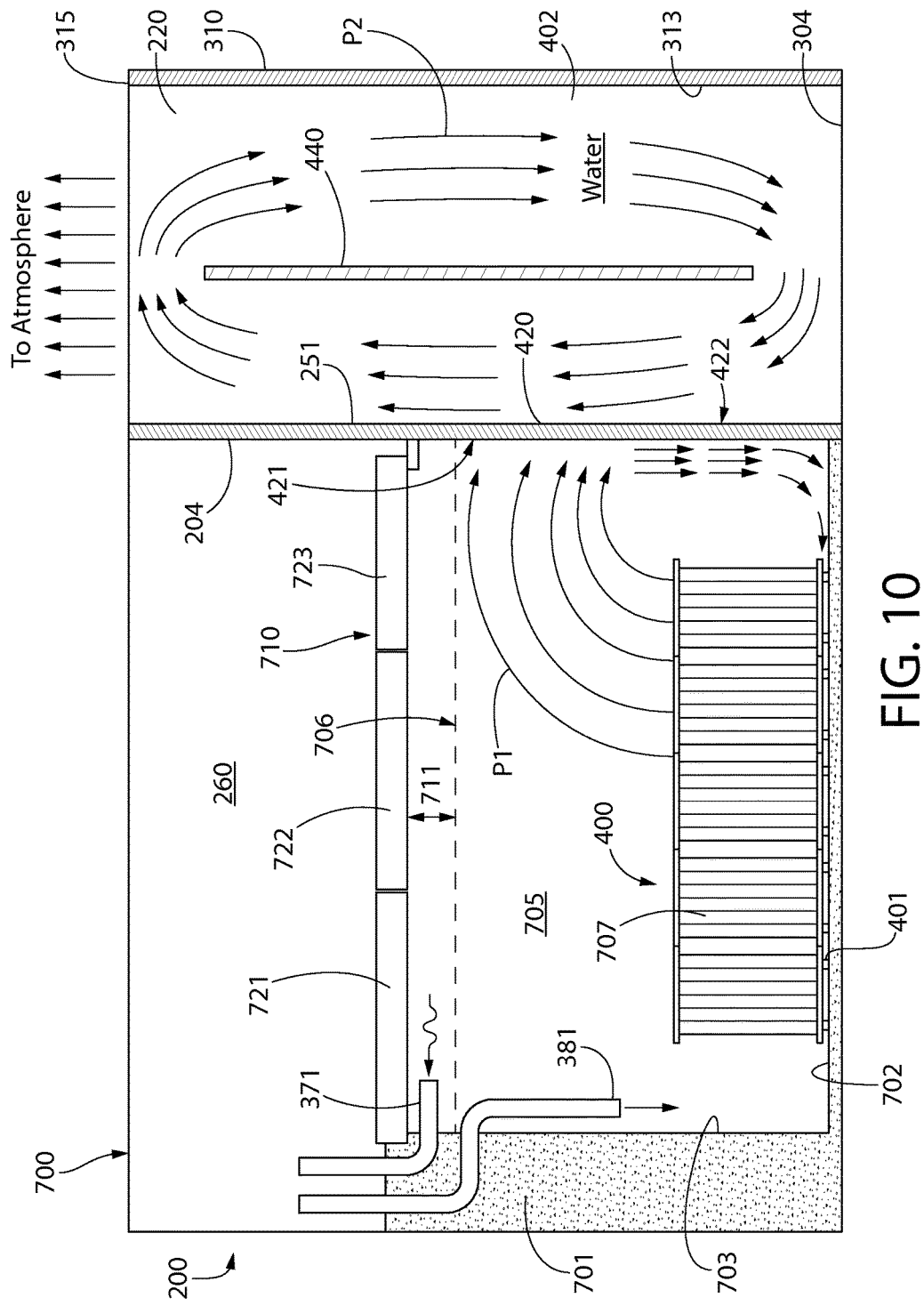
FIG. 10 is a cross-sectional elevation view of the spent nuclear fuel pool and annular reservoir showing additional features for cooling the fuel pool.
Figure 11:
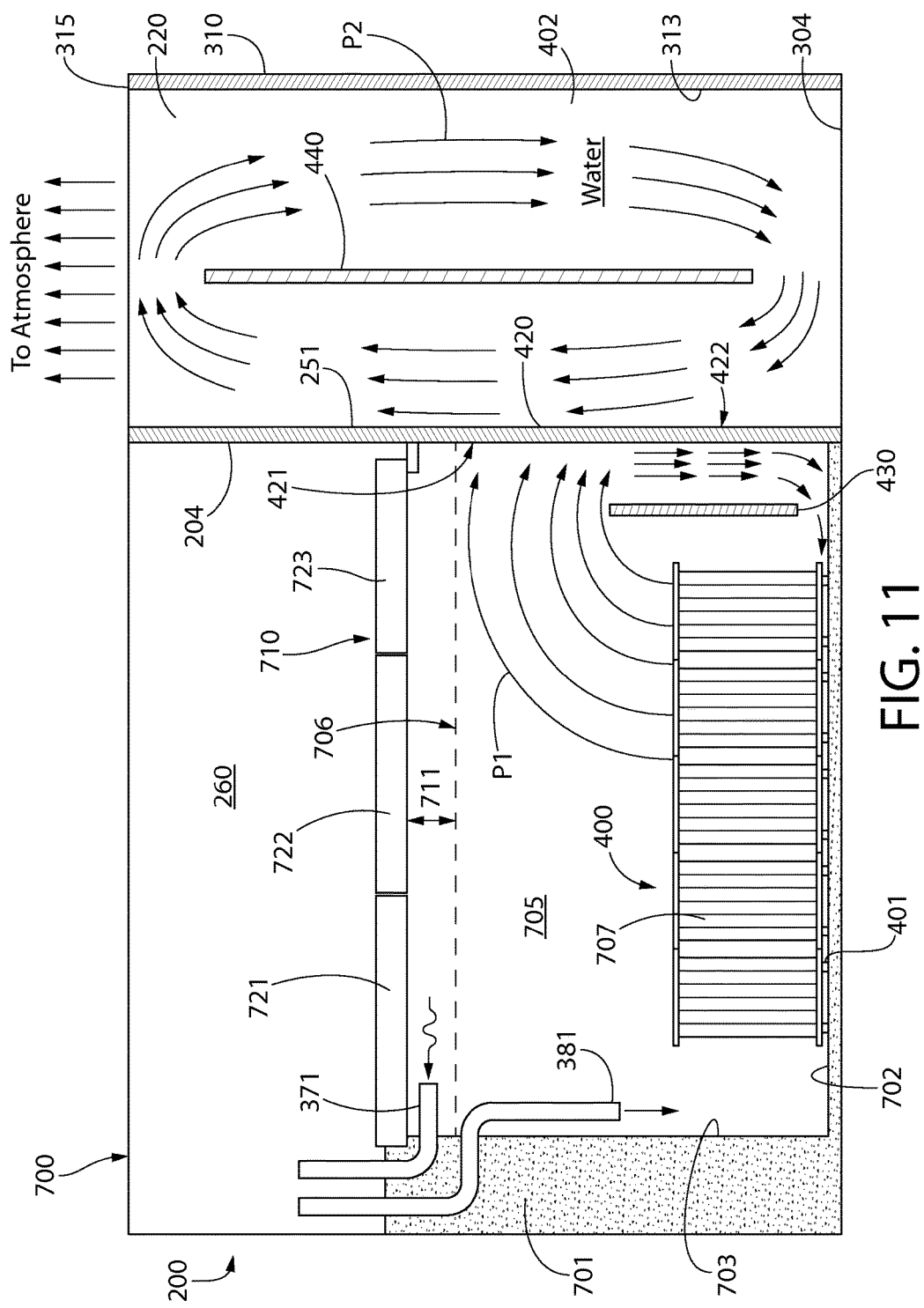
FIG. 11 is the same view thereof with addition of a flow partition wall in the spent fuel pool.

FIGS. 3 and 10-13 depict the non-evaporative based cooling features of spent fuel pool, which will now be described. FIGS. 10 and 11 show the spent fuel pool 700 of FIGS. 7-9, but with some modifications discussed below. Similar elements are labeled similarly and the description thereof previously provided above applies and will not be repeated in full detail here for the sake of brevity.

Referring now to FIGS. 3 and 10, the nuclear spent fuel pool 700 includes a plurality of vertical peripheral sidewalls 701 and a floor 702 that collectively define an interior cavity 703. Floor 702 is preferably flat and horizontal in one embodiment. The body of water 705 (liquid phase) having a surface level 706 is shown contained in the spent nuclear fuel pool 700 within the interior cavity 703. At least one spent nuclear fuel rod 707 is submerged in the body of liquid water 705. In certain embodiment, multiple spent fuel rods 707 may be stored in spent fuel racks 400 which are configured to rest on the floor 702, as further described herein. The racks 400 may include legs 401 designed to raise the racks off the floor and create a gap therebetween to allow the cooling water to flow beneath the racks and improve cooling.

The spent fuel pool 700 may include a lid 710 as described herein which covers the spent nuclear fuel pool 700 and forms a hermetically sealed vapor space 711 between the surface level 706 of the body of liquid water 705 and the lid. The lid 710 may be a single piece (see, e.g. FIG. 7), or include multiple sections such as first lid section 721, second lid section 722, and third lid section 723 that collectively cover the entire spent nuclear fuel pool 700 (see also FIGS. 8-9). Dividers, such as without limitation first divider 730 and second divider 731 which extend from the lid 710 a partial distance into the body of liquid water 705 as shown in FIGS. 8-9, may be provided in some embodiments to segment the vapor space 711. Other embodiments as shown in FIGS. 10 and 11 may omit the dividers. The invention is not limited by the presence or absence of dividers.

In certain embodiments, the spent fuel pool 700 may include provisions for the passive heat exchange sub-system 340 already described in detail herein. Accordingly, riser conduit 370 of the passive heat exchange sub-system 340 may have an inlet 371 located within the vapor space 711, and the return conduit 380 of the passive heat exchange sub-system 340 may have an outlet 381 that is located within the body of liquid water 705 (see also FIG. 7). The passive heat exchange sub-system 340 operates in the same manner described elsewhere herein.

With continuing reference to FIGS. 3 and 10, the peripheral sidewalls 701 may be formed of concrete except for one wall adjacent the annular reservoir 402. In the illustrated embodiment, a portion of the metal cylindrical shell 204 of the containment vessel 200 forms a shared vertical heat transfer wall 420 common to both the containment vessel and spent fuel pool. The heat transfer wall 420 is arranged between the spent fuel pool 700 and the annular reservoir 402 defined by the heat sink 313 disposed between the containment vessel and the inner shell 310 of the containment enclosure 300 already described herein (see e.g. FIGS. 2, 3, 7, and 9 also). There are no intervening structures between the spent fuel pool 700 and annular reservoir 402 other than the heat transfer wall 420. Accordingly, the body of water 705 in the spent fuel pool wets an interior surface 421 of the heat transfer wall and the liquid coolant (water) impounded in the annular reservoir 402 wets an exterior surface 422 of the heat transfer wall. Advantageously, this allows heat to be conducted through the heat transfer wall 420 between the higher temperature body of water 705 in the spent fuel pool 700 (heated by the spent fuel rods 707) and the lower temperature water in the reservoir 402. In addition to the evaporative losses from the body of water 705 which cools the water in the spent fuel pool, the heat transfer wall 420 also acts to cool the water in the pool via conductive heat transfer. This provides a dual cooling mechanism for the spent fuel pool 700 for effective passive heat dissipation.

Heat transfer wall 420 may have an arcuate shape in top plan view (see, e.g. FIG. 3) being formed from a portion of the cylindrical shell 204 of the containment vessel 200. The heat transfer wall 420 preferably extends vertically from the floor 702 of the spent fuel pool 700 to at least the surface level 706 of the body of water 705 in the spent fuel pool 700, alternatively to approximately the lid 710 or higher. This ensures that portion of the spent fuel pool containing the body of water 705 will benefit from the conductive cooling action of the heat transfer wall. The containment vessel cylindrical shell 204, and heat transfer wall 700 comprising a portion thereof, may be made of any suitable conductive metal with sufficient structural strength such as without limitation carbon or low alloy steel, or other metals and alloys.

In operation, the water adjacent the spent fuel racks 400 and spent fuel rods 707 therein is heated via decay heat. The density of the heated water decreases, thereby causing it to rise in the spent fuel pool 700 towards the body of water surface defined by surface level 706. A portion of the heated water near the top of the body of water 705 contacts the inner surface 421 of the heat transfer wall 420 and is cooled by the relatively cooler heat transfer wall (wetted on the outer surface 422 by the colder water in the annular reservoir 402). This causes the now cooler and denser water to sink towards the floor 702. This is sometimes referred to as the "chimney effect." The now cooled water flows back towards the fuel racks 400 where it is heated again and repeats the cycle to form a first recirculating flow pattern P1 as shown by the directional flow arrows.

To increase the chimney effect and flow pattern P1 produced in the spent fuel pool 700, a first vertical flow partition wall 430 may be disposed in the spent fuel pool 700 between a spent fuel rack storage area 403 and heat transfer wall 420 as shown in FIGS. 3 and 11. The flow partition wall 430 is spaced apart from the heat transfer wall 420 and spent fuel storage racks 400. The flow partition wall improves the cooling performance of the heat transfer wall 420. The partition wall 430 may be formed of metal plate, preferably a corrosion resistance metal such as stainless steel in some non-limiting embodiments. Other materials such as concrete may be used in certain embodiments. In one configuration, partition wall 430 may have an arcuate shape in top plan view to complement the shape of the containment vessel shell 204 and heat transfer wall 420. Other shapes may be used.

In operation, the flow partition wall 430 creates a recirculating flow pattern P1 in the spent fuel pool wherein the heated water flows upward from the spent fuel rack 400 along a first side of the flow partition wall, over the flow partition wall, downward along a second side of the flow partition wall contacting the thermally-conductive heat transfer wall 420, and under the flow partition wall back towards the spent fuel rack.

The height of the flow partition wall 430 may be adjusted based on the increase in chimney effect required. The partition wall 430 is configured to allow the recirculating water in the body of water 705 to flow beneath the wall as shown. Accordingly, the wall 430 may be supported from the sidewalls 701 of the spent fuel pool 700 so that the bottom of the wall is spaced vertically apart from the floor 702, flow openings may be formed in the bottom of the wall adjacent to the floor, or vertical standoffs/supports may be attached to the wall to raise the bottom of the wall off the floor. Any suitable method for enabling flow beneath the wall may be used and is not limiting of the invention.

It will be noted that in some embodiments, a flow partition wall 430 may not be used as shown in FIG. 10.

Referring now to FIGS. 3, 10, and 11, a chimney effect is created within the water filled annular reservoir 402 due to the changing densities of the coolant water occurring in a similar manner to the water in the spent fuel pool 700 as described above. The coolant water adjacent the heat transfer wall 420 and inner surface 422 formed thereon is heated as heat is conducted through the heat transfer wall to the reservoir 402 from the body of water 705 in the spent fuel pool 700. The coolant water in the annular reservoir adjacent the heat transfer wall 420 is initially at a temperature lower than the temperature of the wall and heated body of water 705 in the spent fuel pool 700. The heated less dense water in the annular reservoir 402 rises and cools due to evaporative losses to atmosphere at the water level. The cooled less dense coolant water which is now near the surface of the coolant water in the reservoir sinks back towards the base mat 304. This creates a second recirculating flow pattern P2 in the annular reservoir 402 due to the chimney effect.

In some embodiments, a vertical flow partition plate 440 may be disposed in the annular reservoir 402 between the containment vessel shell 204 and inner shell 310 of the containment enclosure 300 to increase the chimney effect and cooling performance in the heat sink 313. Partition plate 440 is preferably disposed at least adjacent to the heat transfer wall 420. This partition plate 440 may preferably be formed of a metal plate in some embodiments or other materials. In one configuration, partition plate 440 may have a substantially arcuate shape in top plan view to conform to the annular shape of the annular reservoir 402. The partition plate 440 may be located at the mid-section of the annular reservoir 402 between the heat transfer wall 420 (and containment vessel shell 204) and the inner shell 310 of the containment enclosure 300. Preferably, the partition plate 440 has an angular extent or width at least coextensive with the angular extent or width of the heat transfer wall 420 to maximize heat removal from the spent fuel pool 700. Accordingly, partition plate 440 may extend less than 360 degrees throughout the annular reservoir 402 in some embodiments. In other embodiments, the partition plate 440 may extend a complete 360 degrees throughout the entire annular reservoir 402 forming an annular shaped flow structure.

In operation, the flow partition plate 440 creates a recirculating flow pattern in the annular reservoir 402 wherein the heated coolant water flows upward along a first side of the flow partition plate, over the flow partition plate, downward along a second side of the flow partition plate, and under the flow partition plate back towards the thermally-conductive common wall.

The height of the flow partition plate 440 in the annular reservoir 402 may be adjusted based on the increase in chimney effect required. The partition plate 440 is configured to allow the recirculating water in the body of water 705 to flow beneath the wall as shown. Accordingly, the plate 440 may be supported from any available structure within the annular reservoir 402 such as the fins 220 so that the bottom of the wall is spaced vertically apart from the base mat 304. Alternatively, vertical standoffs/supports may be attached to the plate 440 to raise the bottom of the wall off the base mat 304, or flow openings may be formed in the bottom of the plate 440 adjacent to the base mat. Any suitable method for enabling flow to pass beneath the wall may be used and is not limiting of the invention.

As best shown in FIG. 3, the flow partition plate 440 may be comprised of a plurality of individual segments 442 which collectively form the partition wall structure. The segments 442 may each be mounted between pairs of the adjacent circumferentially spaced apart heat exchange fins 220 which serve to support the plate 440. Depending on the circumferential spacing of the fins 220, the segments 442 in certain embodiments may each be comprised of flat metal plates welded or otherwise attached between the fins which collectively approximates an arcuately shape in top plan view (hence the shape may be referred to as substantially arcuate). In other embodiments, the segments 442 may comprise arcuately curved plates attached between the fins.

The segments 442 form a plurality of or wedge shaped isolated pie flow regions 441 between the fins. Flow through-holes may be provided which extend completely through the fins 220 in some embodiments to allow mixing of the flow and reservoir coolant water between these regions. Alternatively, the fins 220 may not extend all the way to the base mat 304 to allow flow to mix between the regions 441. In certain embodiments, fins 220 may not be provided in the annular reservoir 402 in which case the partition plate 440 will be supported from the base mat 340 and upper portions of the plate 440 may be braced by lateral struts attached to the cylinder shell 204 of the containment vessel 200 and/or inner shell 310 of the containment enclosure 300 for rigidity.

It will be appreciated that the decay heat released by the spent fuel rods 707 in the spent fuel pool 700 is the motive force that drives both the natural circulation and the passive cooling in both the spent fuel pool and the annular reservoir 402.

Figure 12:
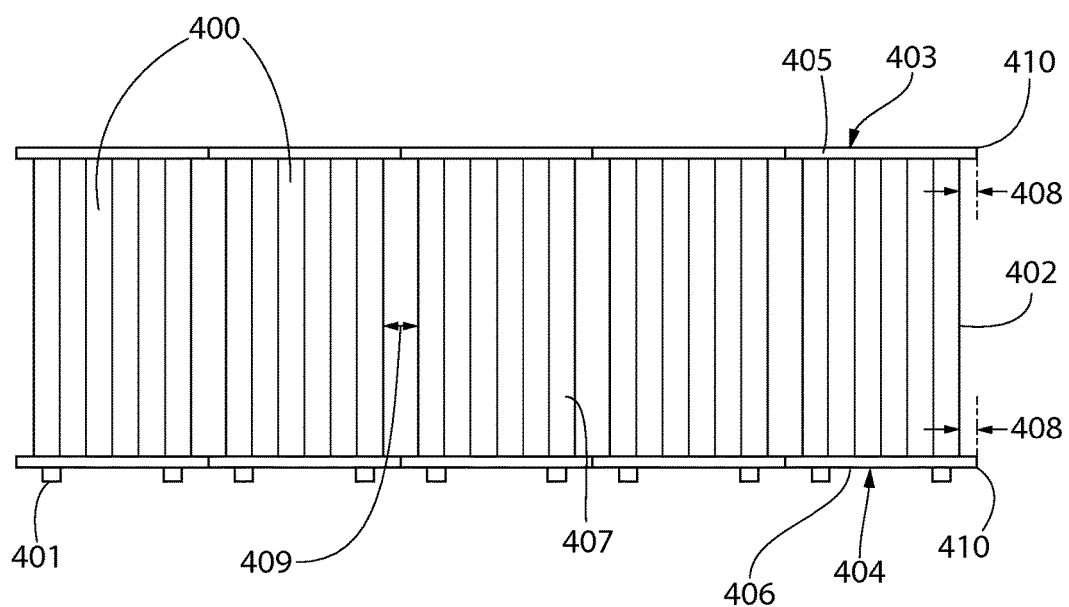
FIG. 12 is a side elevation of a spent fuel rack configured for holding spent nuclear fuel rods which incorporates cooling features.
Figure 13:
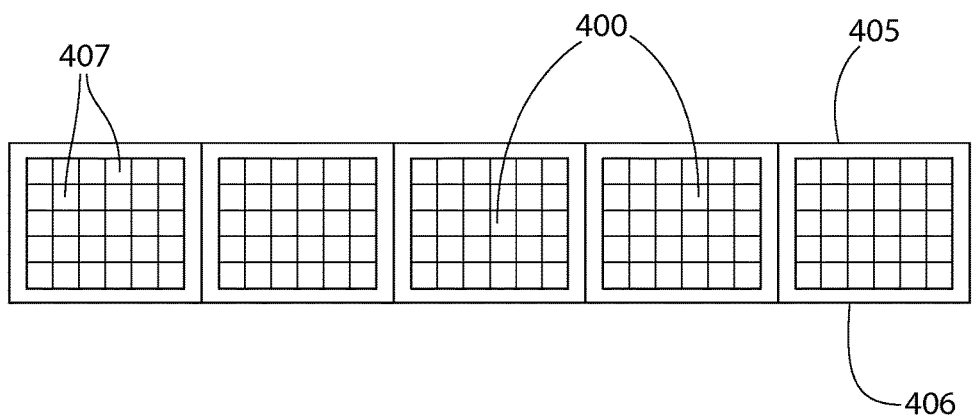
FIG. 13 is a top plan view thereof.

According to another aspect of the invention, each individual spent fuel rack 400 is further configured to facilitate and increase heat dissipation from the spent fuel rods for effective cooling. FIGS. 12 and 13 are side elevation and top plan views respectively of a plurality of fuel racks 400 which may be grouped together in close proximity on the fuel rack storage area 403 portion of the spent fuel pool floor 702.

Referring to FIGS. 11-13, each spent fuel rack 400 includes an elongated body comprised of a plurality of hollow tubes 407, a top plate 405, and bottom plate 406. The tubes 407 include open tops 403 which allow insertion and storage of spent fuel rods in each tube. The bottoms 404 of the tubes may be closed except for a drainage hole to enable removal of water from the tubes when the racks are lifted out of the spent fuel pool 700. In one embodiment configuration, the tubes 407 may have rectilinear transverse cross sections forming square or rectangular tube shapes in top plan view. This allows dense packing of the tubes in each rack to maximize spent fuel rod capacity. A plurality of legs 401 are attached to the bottom plate 406 to raise the racks off the spent fuel pool floor 702 to permit cooling water in the pool to flow beneath the bottom plate 406 for improved cooling.

The tubes 407, top plate 405, and bottom plate 406 may be formed of metal to efficiently conduct heat away from the spent fuel rods 707. In some embodiments, the tubes may be formed of a metal-matrix composite material, such as a discontinuously reinforced aluminum/boron carbide metal matrix composite material or boron impregnated aluminum for neutron absorption.

To maximize cooling of the racks 400 and spent fuel rods 707 contained in the tubes 407, the top and bottom plates 405, 406 may each extend laterally beyond the tubes on all four sides of the rack by a distance 408 forming peripheral extension portions 410. The extension portions 410 are bare exposed metal and provide additional heat transfer surface area for increasing heat removal from the spent fuel racks. An example of a fuel rack with such an extended bottom plate is disclosed in commonly owned U.S. patent application Ser. No. 14/367,705, which is incorporated herein by reference in its entirety.

In one embodiment, the top plate 405 may be configured as a perimeter frame allowing access to the open tops of the tubes. By contrast, the bottom plate 406 may cover the entire bottom area of the tubes forming a floor for each tube. The top and bottom plates 405, 406 of each spent fuel rack 400 may have the same lateral width and length (in top plan view) to allow multiple racks to be efficiently abutted when emplaced on the fuel rack storage area 403 of the spent fuel pool floor 702. The extension portions 410 of the racks further create horizontal gaps 409 between adjacent spent fuel racks 400 to allow the cooling water in the spent fuel pool 700 to flow between the racks for additional cooling.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A passively-cooled spent nuclear fuel pool system, the system comprising:
   a containment vessel comprising a thermally-conductive cylindrical shell formed of metal;
   an annular reservoir surrounding the cylindrical shell of the containment vessel, the annular reservoir holding a coolant that defines a heat sink;
   a spent fuel pool disposed in the containment vessel, the fuel pool comprising:
      a floor and a peripheral sidewall extending upwards from the floor that collectively define an interior cavity;
      a body of water disposed in the interior cavity and having a surface level, at least one spent nuclear fuel rod submerged in the body of water that heats the water to form water vapor via evaporation; and
      a removable lid covering the spent fuel pool to form a sealed vapor space between the surface level of the body of water and the lid;
   a passive heat exchange sub-system comprising an assembly of:
      a primary riser section fluidly coupled to the vapor space;
      at least one downcomer fluidly coupled to the primary riser section for receiving the water vapor from the primary riser section, the water vapor condensing within the at least one downcomer to form a condensed water vapor; and
      at least one return conduit fluidly coupled to the at least one downcomer, the at least one return conduit having an outlet located within the body of liquid water for returning the condensed water vapor to the body of liquid water;
   wherein the peripheral sidewall of the fuel pool is formed by a portion of the cylindrical shell of the containment vessel adjacent to the spent fuel pool which defines a shared heat transfer wall, the heat transfer wall operable to transfer heat from the body of water in the spent fuel pool to the heat sink for cooling the body of water.

2. The system according to claim 1, wherein the at least one downcomer is attached to the cylindrical shell of the containment vessel for transferring heat to the heat sink.

3. The system according to claim 1, wherein the annular reservoir contains water as the liquid coolant having a lower temperature than the body of water in the fuel pool.

4. The system according to claim 1, wherein the heat transfer wall has an arcuate shape in top plan view.

5. The system according to claim 1, further comprising a vertically oriented flow partition plate disposed at least in a portion of the annular reservoir adjacent the heat transfer wall, the flow partition plate spaced radially apart from the heat transfer wall and configured to define a convective flow path that induces natural gravity circulation of the liquid coolant in the annular reservoir.

6. The system according to claim 5, wherein the flow partition plate includes a bottom spaced above a base mat of the annular reservoir and a top spaced apart below a top end of the annular reservoir such that a liquid coolant circulation flow path is formed over and under the flow partition plate.

7. The system according to claim 5, further comprising a plurality of heat exchange fins extending radially outwards from cylindrical shell of the containment vessel into the annular reservoir, and wherein the flow partition plate is supported by the heat exchange fins.

8. The system according to claim 7, wherein the flow partition plate is comprised of a plurality of segments each attached between a pair of heat exchange fins.

9. The system according to claim 1, further comprising a vertically oriented flow partition wall disposed in the fuel pool between a spent fuel rack storage area on the floor and the heat transfer wall, the flow partition wall configured to define a convective flow path that induces natural gravity circulation of the body of water in the fuel pool.

10. The system according to claim 1, wherein the heat transfer wall has an arcuate shape in top plan view.

11. The system according to claim 1, wherein the annular reservoir is vented to atmosphere for cooling the liquid coolant via evaporative loss.

* * * * *